United States Patent [19]

Ueda et al.

[11] 4,374,074
[45] Feb. 15, 1983

[54] PROCESS FOR PRODUCING FIBERS WITH A SPECIALLY FIXED SIZE FROM MELTS

[75] Inventors: Setsuo Ueda, Chigasaki; Takashi Yasuda, Aichi; Tokuyoshi Yamada, Nagoya; Shigeki Kobayashi, Tokyo, all of Japan

[73] Assignees: Sato Technical Research Laboratory Ltd., Kanagawa; Itoh Metal Abrasive Co., Ltd., Aichi, both of Japan

[21] Appl. No.: 202,864

[22] Filed: Oct. 31, 1980

Related U.S. Application Data

[63] Continuation of Ser. No. 69,851, Aug. 27, 1979, Pat. No. 4,323,523.

[30] Foreign Application Priority Data

Aug. 29, 1978 [JP] Japan ............................... 53-104430

[51] Int. Cl.³ .............................................. B01J 2/14
[52] U.S. Cl. .......................................... 264/8; 264/14
[58] Field of Search ..................................... 264/8, 14

[56] References Cited

U.S. PATENT DOCUMENTS

| | | | |
|---|---|---|---|
| 3,346,673 | 10/1967 | Last et al. | 264/8 |
| 3,466,352 | 9/1969 | Corbett | 264/8 |
| 3,887,667 | 6/1975 | Clark | 264/8 |
| 4,178,335 | 12/1979 | Metcalfe | 264/8 |

Primary Examiner—James R. Hall
Attorney, Agent, or Firm—Stevens, Davis, Miller & Mosher

[57] ABSTRACT

A process is disclosed for producing spherical particles or fibers with a specially fixed size from a melt of metal, slag, or flux, by introducing the melt onto the center of a rotating disk through a conduit so as to form a thin film stream of boundary layer on the disk; projecting the thin film stream at a high speed from the disk periphery into surrounding space to split up the film stream into linear streams; and cooling the linear streams for producing fibers or cooling droplets after further splitting of the each linear stream into droplets for producing spherical particles, with or without parallel or countercurrent gas flow to the linear streams.

5 Claims, 21 Drawing Figures dosz# PROCESS FOR PRODUCING FIBERS WITH A SPECIALLY FIXED SIZE FROM MELTS This is a continuation of application Ser. No. 069,851, filed Aug. 27, 1979, now U.S. Pat. No. 4,323,523.

BACKGROUND OF THE INVENTION

1. Field of the Invention

This invention relates to a process for producing spherical particles or fibers with a specially fixed size from a melt of metal, flux, or slag. More particularly, the invention relates to a process for producing spherical particles or fibers with a specially fixed size, by forming thin film streams of a melt of metals, metallurgical slags, or fluxes on a flat rotating disk, and projecting the thin film streams into space at a high speed from the periphery of the disk.

2. Description of the Prior Art

A number of processes have been proposed heretofore for producing roughly spherical particles or round sectioned fibers by pouring a melt onto the surface of rotating bodies. Most of the prior art processes can be classified into two categories in accordance with the type of melts. One is the production of spherical or globular particles from metallic melts and another is the production of fibers from easily vitrifiable non-metallic melts.

One example of such prior processes was disclosed in U.S. Pat. No. 3,660,544, which relates to a process and an apparatus for producing globular particles of ferroalloys. The aforesaid U.S. Patent used a rotary drum with a downwardly convex bottom surface around a central opening and a rotary anvil having a conical center projection and an upwardly concave upper surface extending radially from said projection; said anvil is concentrically set below said drum and the gap between said convex and concave surface is maintained at fixed dimensions; said anvil is rotated in the opposite direction to that of said drum; molten, being poured onto said conical center projection of the anvil through said opening of the drum, is granulated during passing through said gap between said convex and concave surfaces, and the granules thus formed exit from the periphery of said anvil to drop into water.

The aforesaid example of the prior art has such defects that internal liquid friction and intense cooling effect inevitably cause random split of the molten metal stream when the melt is passing through the gap between the two curved surfaces rotating in mutually opposite directions. Therefore, uniform shape and size of the particles cannot be obtained.

SUMMARY OF THE INVENTION

The present invention relates to a process for producing spherical particles or fibers with a specially fixed size from a melt of metals, fluxes, or slags, characterized by introducing the melt of metals, fluxes, or slags through a conduit onto the center of a rotating disk at a predetermined flow rate; forming a thin film stream of said melt with a specific thickness, at least, in the proximity of the periphery of said disk, said thin film stream being provided with a tangential velocity component as well as a radial velocity component throughout the entire thickness thereof, by suitably selecting a diameter and a rotational speed of said disk according to kinematic viscosity of said melt; projecting said thin film stream into space from the periphery of said disk; splitting said thin film stream into free linear streams with a fixed radius by termination of said tangential velocity component and the additional action of surface tension; and solidifying said free linear streams for producing fibers with a specially fixed diameter, or solidifying said projected melt after splitting said free linear streams into spherical droplets with a fixed diameter by the reduction of the space motion velocity of said free linear streams and the action of surface tension, for producing spherical particles with a specially fixed diameter.

In practicing the process according to the present invention, the outlet of a conduit introducing the melt onto the center of the rotating disk should preferably be fixed so that the distance between said outlet and the disk surface $h_o$ is in the range of $r_o/2$ to $(r_o/2+2)$ mm, where $r_o$ is the radius of the conduit outlet opening in mm.

For the production of spherical particles with the present invention, it is preferable to form additional jet streams of gas with the directions opposite to those of the free linear streams of the melt projected from the rotating disk periphery, at a room or lower temperature and at an atmospheric or higher pressure.

For the production of fibers by the process of the present invention, it is preferable to form additional jet streams with the same directions as those of the free linear streams of the melt projected from the rotating disk periphery, at a room or higher temperature and at an atmospheric or lower pressure.

In an apparatus for producing spherical particles or fibers with a specially fixed size according to the process of the present invention, a rotating disk to be used for treating the melt must have such construction that the disk plate is a block of a refractory material selected from the group consisting of fused silicon, graphite, silicon carbide, silicon nitride, zircon, chamotte, alumina, and magnesia; the bottom surface of the aforesaid block is attached to a heat-insulating firebrick layer; the bottom surface of said heat-insulating firebrick layer is attached to a mat of heat-insulating fibrous materials; the aforesaid block, heat-insulating firebrick and the mat of heat-insulating materials are set in a holder of heat-resisting steel consisting of a side ring and a bottom plate; said side ring has a plurality of protuberances on its inside wall at regular intervals, while said block has a plurality of grooves on its peripheral side wall corresponding to said protuberances on the inside wall of said side ring; the block is set in said holder by mutual engagement of said protuberances and grooves; the gap between the holder and the block is filled with a castable refractory; thereby the disk block, the heat-insulating firebrick, the mat of heat-insulating fibrous materials and the holder are united into one rotor unit.

The aforesaid block preferably consists of a top portion of a short cylindrical shape, an intermediate portion of a truncated cone shape with a gently sloped conical surface, and a bottom portion of a truncated cone shape with a steeply sloped side wall having a plurality of grooves at regular intervals.

The height of the top cylindrical portion of the aforesaid preferred disk block may be 1 to 2 mm, and the slope of the conical surface of the intermediate portion may be 12 to 35 degrees, and the slope of the side wall of the bottom portion may be 60 to 80 degrees.

When the disk plate is necessarily made of a refractory selected from the aforesaid group except fused silica and graphite, said disck block should preferably be such a combined block that the combined block consists of a center block of a selected refractory, a surrounding block of fused silica and, if necessary, a bottom plate of neutral refractory; the center block has a top portion of a short cylindrical shape with a height of 1 to 2 mm, while its lower portion is a cylinder with a regular polygonal section; the surrounding block of fused silica has a central hole with the same polygonal section dimensions as those of the lower portion section of said center block; the bottom plate of neutral refractory is, if necessary, attached to the bottom surface of said center block; the combined block is formed by fitting the center block and the neutral refractory plate into the hole of the surrounding block of fused silica.

The melt to be used for producing spherical particles or fibers according to the present invention is mainly that of a material selected from the group essentially consisting of metals, fluxes, and slags. The temperature of the melt is preferably kept between the fusion temperature and the fusion temperature plus approx. 100° C. Practical operation temperatures, therefore, are determined mainly by taking the fusion temperatures into consideration. The melt temperature of 1,200° C. to 1,800° C. is preferable for such metallic melts as iron and steel; the melt temperature of 600° C. to 1,300° C. is preferable for molten fluxes; and the melt temperature of 1,100° C. to 1,800° C. is preferable, e.g., for production of slag wool from molten slags.

To achieve the object of the invention, the following factors should rationally be controlled; (1) kinematic viscosity of the melt, (2) surface tension of the melt, (3) rotational speed of the rotating disk, (4) effective diameter of the rotating disk, (5) flow rate of the melt from the conduit outlet, (6) distance between the conduit outlet and the rotating disk, (7) diameter of the conduit outlet, and (8) composition of the melt.

With the present invention, it is preferable to select the kinematic viscosity of the melt in the range of 0.001 to 10 cm$^2$/sec. A kinematic viscosity larger than 10 cm$^2$/sec cannot cause uniform gravitational flow by the weight through a conduit. However, if an additional pressure considerably higher than the atmospheric pressure is applied to the melt, a kinematic viscosity of the melt larger than 10 cm$^2$/sec may be allowed. Conversely, such an extremely low kinematic viscosity as less than 0.001 cm$^2$/sec can only be obtained with excessively high temperature heating, and can be associated with uneconomical operating conditions. In general, when the kinematic viscosity is high, the melt may be easily solidified in the form of continuous thread-like products, i.e., fibers, while fine particles may be easily obtained with the low kinematic viscosity of the melt.

The ratio of surface tension to density of the melt is preferably in the range of 40 to 400 dyne·cm$^2$/g. Both surface tension and density of the melt are inherent properties of the melt. For melts of such materials as ferrous and non-ferrous metals, metallurgical fluxes and slags, etc., the aforesaid ratios fall in the range referred to above.

In the present invention, the diameter and the rotational speed of the rotating disk on which the melt is introduced are important factors, and such speed and diameter have a close relationship with the aforesaid kinematic viscosity and the surface tension of the melt itself. The rotational speed of the rotating disk is preferably 3,000 to 30,000 r.p.m. If the rotational speed is less than 3,000 r.p.m., the centrifugal force produced is too small to form a sufficiently thin film stream on the rotating disk. As regards the rotational speed of the rotating disk, the higher the speed is, the better the results tend to be, but the upper speed limit of 30,000 r.p.m. is sufficient for achieving the object of the invention. Rotational speeds higher than 30,000 r.p.m. may be inevitably associated with too severe mechanical conditions or too expensive mechanical constructions.

The diameter of the rotating disk made of refractory is determined by taking its rotational speed and the kinematic viscosity of the melt into consideration. With the present invention, the melt introduced onto the center of the rotating disk through a conduit should be forced to move radially so as to form a thin film stream of a specific thickness at the periphery of the disk. The specific thickness is determined as a function of the kinematic viscosity of the melt, the rotational speed of the rotating disk, the diameter of the rotating disk, and the flow rate of the melt from the conduit outlet. Thus, the aforesaid specific thickness of the thin film stream is selected in accordance with physical properties of the melt.

The diameter of the rotating disk to be used in the process of the present invention is preferably in the range of 50 to 200 mm. The design of an apparatus driving the disk with a diameter of larger than 200 mm at 3,000 r.p.m. or faster involves many difficulties, while with a rotating disk of a diameter smaller than 50 mm, it is difficult to obtain a sufficiently large centrifugal force for producing the thin film stream of the required thickness. What is meant by the disk diameter here refers to the effective diameter of the top disk portion of the aforesaid refractory block which is fitted in the aforesaid rotor unit, but not to the diameter of the metallic holder supporting the block.

The outflow velocity of the melt from the outlet of the conduit is preferably in a range of 5 to 500 cm/sec, depending on the kinematic viscosity of the melt. As the kinematic viscosity of the melt increases, the outflow speed of the melt becomes slower under the same static pressure of the melt, while with the decreasing kinematic viscosity, the outflow speed becomes higher. This outflow speed of the melt also affects the thickness of the thin film stream formed on the periphery of the rotating disk.

The inside diameter of the conduit outlet opening $r_o$ (mm) to be used in the process of the present invention is preferably in a range of 3 to 30 mm. The inside diameter larger than 30 mm tends to cause an excessive outflow onto the rotating disk, resulting in the formation of a too thick film stream of the melt at the periphery of the rotating disk under a given disk diameter and a given disk rotational speed. On the other hand, if the inside diameter of the conduit outlet is too small, the distance between the outlet opening and the rotating disk $h_o$ (mm) becomes very small due to the aforesaid preferred condition of $(r_o/2) \leq h_o \leq (r_o/2)+2$, and the adjustment of the distance becomes rather difficult. The reason for preferring the aforesaid range of the distance $h_o$ is such that; when the distance $h_o$ is smaller than $r_o/2$ mm, the melt around the conduit outlet tends to swell and hamper the uniform flow of the melt on the disk; if the distance $h_o$ is larger than $\{(r_o/2)+2\}$ mm, the free falling stream from the outlet strikes directly the disk surface causing unfavorable turbulence of the thin film stream, and the production of spherical particles or fibers with a specially fixed size becomes difficult.

BRIEF DESCRIPTION OF THE DRAWING

For a better understanding of the present invention, references are made to the accompanying drawings, in which.

Figure 1:
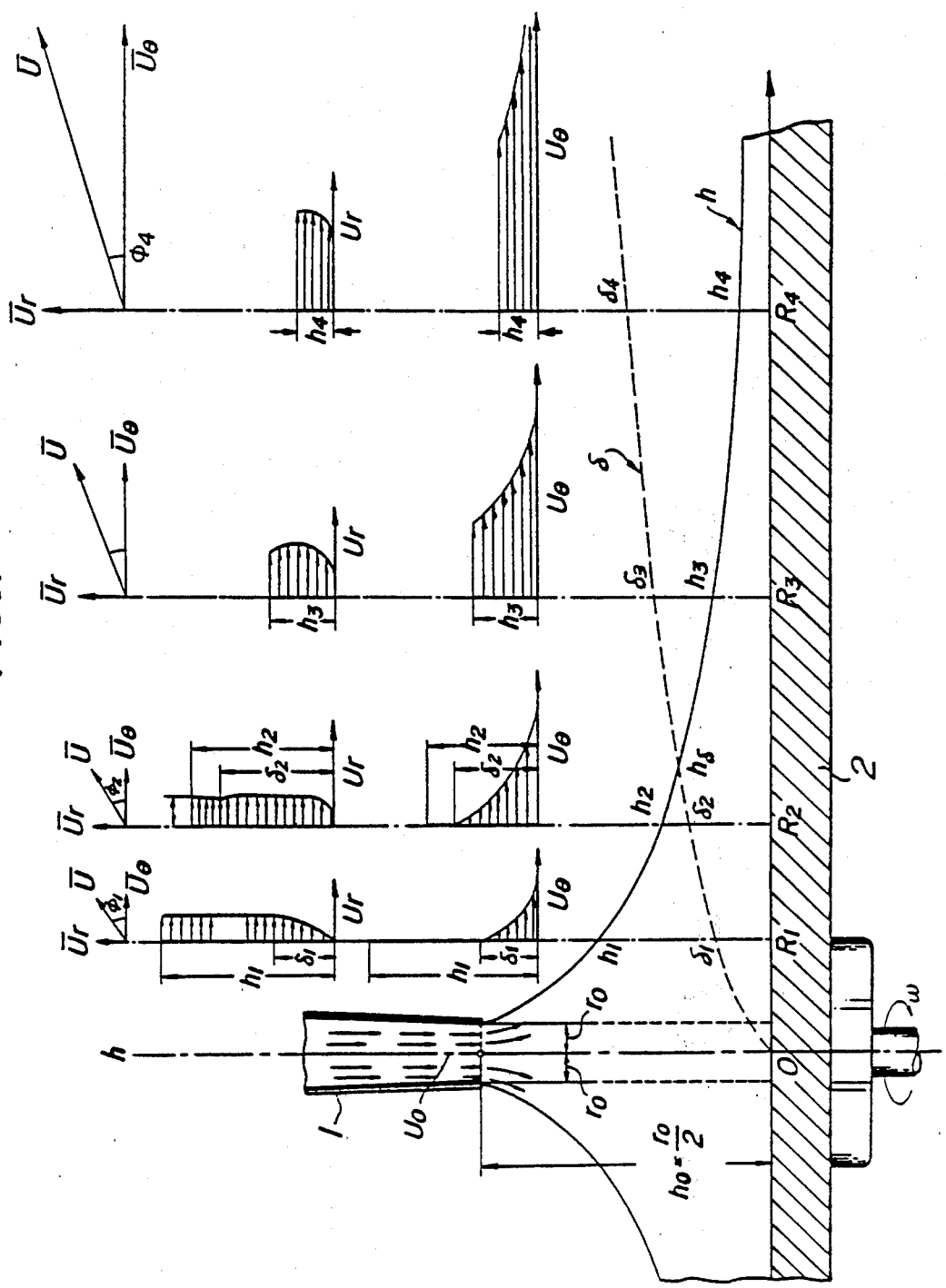
FIG. 1 is a schematic vertical sectional view showing the manner in which the melt introduced through a conduit onto the center of a rotating disk is spreading and forming a thin film stream of boundary layer on the rotating disk.

Throughout the different views of the drawing, 1 is a conduit; 2 is a rotating disk; 3 is a thin film stream; 4 is a linear stream; 5 is a spherical droplet; 6 is a tundish; 7 is an annular gas main; 8 is a guide plate; 9 is an annular slit comprising a series of passageways; 10 is a link mechanism; 11 is a disk block of fused silica or graphite; 11a is a center block of a specially selected refractory material; 11b is a surrounding block of fused silica; 11c is a groove on the side wall of the fused silica disk block or the surrounding block; 12 is a side ring of a holder; 12a is a protuberance on the inside wall of the side ring; 13 is a bottom plate of the holder; 14 is a short leg projected downwardly from the bottom plate of the holder; 15 is a boss; 16 is a heat-insulating firebrick; 17 is a mat of heat-insulating fibrous materials; 18 is a castable refractory filler; 19 is a neutral refractory plate; 20 is a solidification chamber shell, 21 is a driving mechanism.

DESCRIPTION OF THE PREFERRED EMBODIMENT

The result of studies by the inventors will now be described by referring to the drawings.

FIG. 1 illustrates the manner in which, when a melt is introduced through a conduit 1 with an outlet opening of radius $r_o$ at a constant outflow velocity $U_o$ onto a rotating disk 2 revolving at a fixed angular velocity $\omega$ (rad/sec) so as to form a stable thin film stream 3, the film thickness h and the velocity distribution in the thin film stream 3 vary with the radius r on the rotating disk. If the melt is approximated to an ideal fluid, the vertical stream with the velocity $U_o$ can be converted into a stable thin film stream without any turbulence, when the vertical volumetric flow rate $\pi r_o^2 U_o$ through the cross section area $\pi r_o^2$ is equal to a horizontal volumetric flow rate $2\pi r_o h_o U_o$ flowing out from the cylindrical opening with radius $r_o$ and height $h_o$, i.e., when the distance $h_o$ between the conduit outlet and the disk surface is determined so as to satisfy the condition of continuity. This condition leads to the following equation:

$$h_o = r_o/2 \tag{1}$$

For the purpose of more obvious expression, the scale of the vertical coordinate h in FIG. 1 is shown in the magnification of the radial coordinate r by five times.

When a viscous fluid flows on a flat plate, the fluid velocity in the proximity of the plate surface is greatly reduced by fluid friction and the so-called "boundary layer" is formed. In the fluid on a rotating disk, the rotation at a lower angular velocity produces a "laminar boundary layer", while at a higher angular velocity a "turbulent boundary layer" is formed. In FIG. 1, when the disk is at a standstill, a boundary layer is formed only by the radial flow with the initial velocity $U_o$, but if the rotational speed increases higher than 500 r.p.m., the boundary layer formation on the rotating disk is mainly due to the motion of rotation and the contribution of the initial radial velocity $U_o$ becomes negligibly small. With the present invention, the boundary layer due to the disk revolution is very important. Reynolds number Re for a boundary layer formed on the revolving disk is given by the following equation:

$$Re = \omega R^2/\nu$$

where $\nu$(cm/sec) is kinematic viscosity of the melt, and R (cm) is the radius of the rotating disk.

A turbulent boundary layer is formed under the following condition:

$$Re = \omega R^2/\nu \geq 1 \times 10^5 \quad (2)$$

However, the following condition causes the formation of a laminar boundary layer:

$$Re = \omega R^2/\nu < 6 \times 10^4 \quad (2)'$$

With Reynolds number values between the values of the above two equations, a transitional region is formed. The thickness $\delta$ (cm) of the turbulent boundary layer and the thickness $\delta'$ (cm) of the laminar boundary layer are given by the following equations, respectively.

$$\delta = 0.526 \left(\frac{\nu}{\omega}\right)^{1/5} r^{3/5} \quad (3)$$

$$\delta' = 3.38 \left(\frac{\nu}{\omega}\right)^{\frac{1}{2}} \quad (3)'$$

According to the above equations, the thickness of the turbulent boundary layer increases with the radial coordinate r, but the thickness of the laminar boundary layer does not depend on the radial coordinate r. The present invention uses either the turbulent or laminar boundary layer.

The theory of the present invention when using the turbulent boundary layer will now be described. If a position in a turbulent boundary layer with a thickness $\delta$ is represented by an ordinate z having its origin on the disk surface, the tangential velocity component $U_\theta$ and the radial velocity component $U_r$ at a point considered are given by the following equations for the section of $0 \leq z \leq \delta$:

$$\frac{U_\theta}{\omega r} = 1 - \left(\frac{z}{\delta}\right)^{1/7} \quad (4)$$

$$\frac{U_\theta}{\omega r} = 0.162 \left(\frac{z}{\delta}\right)^{1/7} \left(1 - \frac{z}{\delta}\right) \quad (5)$$

Accordingly, if the thickness of the thin film stream at a position of radial coordinate r is represented by h (cm), the mean values of the velocity components $U_\theta$ and $U_r$ can be calculated by the following equations:

$$\overline{U_\theta} = \frac{1}{h} \int_0^\delta U_\theta dz \quad (6)$$

$$\overline{U_r} = \frac{1}{h} \left\{ \int_0^\delta U_r dz + U_o(h - \delta) \right\} \quad (7)$$

where $\overline{U_\theta}$ and $\overline{U_r}$ are the mean values of $U_\theta$ and $U_r$, respectively. The second term of equation (7) should be added only when the total film thickness h is larger than the thickness $\delta$ of the boundary layer, i.e., $h > \delta$, and the flow in the region of (h-$\delta$) has only a uniform initial velocity $U_o$. The resultant mean velocity $\overline{U}$ at the position of radial coordinate r and the direction $\phi$ (the angle between $\overline{U}$ and $\overline{U_\theta}$) of the velocity U are given by the following equations:

$$\overline{U} = (\overline{U_r}^2 + \overline{U_\theta}^2)^{\frac{1}{2}} \quad (8)$$

$$\phi = \tan^{-1} \frac{\overline{U_r}}{\overline{U_\theta}} \quad (9)$$

The thickness h of the film stream at the position of the radial coordinate r can be determined by applying "try-and-out method" to the following equation:

$$h\overline{U_r} \simeq \int_0^\delta U_r dz + (h - \delta)U_o \quad (10)$$

The second term of the equation (10) is added only when $h > \delta$, as in equation (7).

Referring to FIG. 1, the $\delta$-r curve, the h-r curve, the values of $U_\theta$, $U_r$, $\overline{U_\theta}$, $\overline{U_r}$, $\overline{U}$ and $\phi$ at a position of an arbitrary radial coordinate r can be calculated by using equations (2) through (10), when the angular velocity $\omega$, the volumetric flow rate of the melt $\pi r_o^2 U_o$, and the kinematic viscosity of the melt $\nu$ are given. At $r = R_1$, the thickness $\delta_1$ of the boundary layer is smaller than the thickness $h_1$ of the film stream and, therefore, the portion of ($h_1$-$\delta_1$) has only a radial velocity which is equal to the initial velocity $U_o$. In the boundary layer with the thickness $\delta_1$, however, the liquid has two velocity components, i.e., the radial velocity component $U_r$ and the tangential velocity component $U_\theta$ and $U_r = 0$ and $U_\theta = $ maximum on the surface of the disk. The direction of the flow should be equal to the direction of the resultant velocity $\overline{U}$, i.e., that of the resultant vector of the mean radial velocity component $\overline{U_r}$ and the mean tangential velocity component $\overline{U_\theta}$. The direction is represented by the angle $\phi$ between $\overline{U}$ and $\overline{U_\theta}$ as shown in FIG. 1. At $r = R_2$, the condition $h_2 > \delta_2$ is still retained. At $r = R_3$ and $r = R_4$, however, the conditions $h_3 < \delta_3$ and $h_4 < \delta_4$ are produced. Consequently, the entire thin film stream is included in the boundary layer. The boundary layer thickness increases with increasing radial coordinate r, and both radial velocity component $U_r$ and tangential velocity component $U_\theta$ are also correspondingly increased. In this event, however, the increase of $U_\theta$ is much more remarkable.

The direction of velocity $\overline{U}$, therefore, approaches that of the mean tangential velocity component $\overline{U_\theta}$ and the angle $\phi$ becomes smaller. Thus, as the values of angular velocity $\omega$ and radial coordinate r increase, the thickness h of the thin film stream becomes smaller, and the entire thin film stream constitutes a turbulent boundary layer and is projected from the periphery of the disk at a high velocity U with a direction of small angle $\phi$.

Figure 2A:
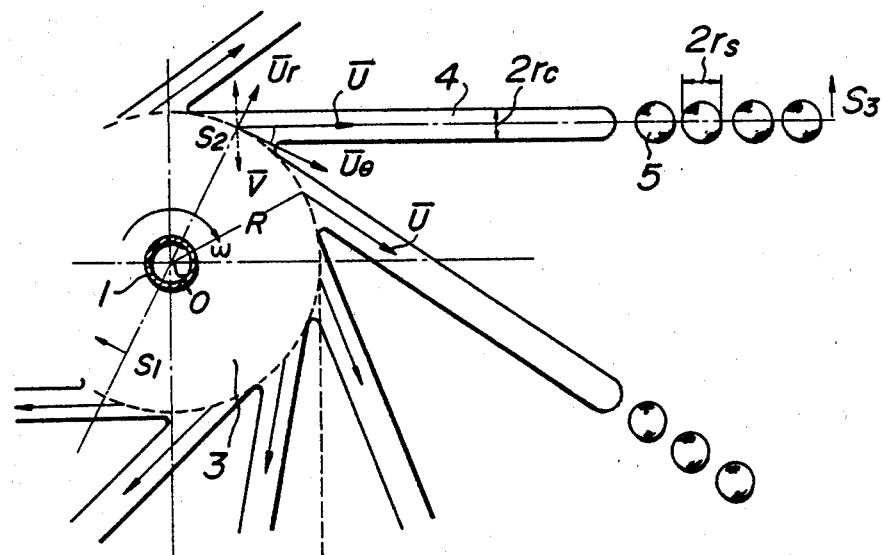
FIGS. 2(A) and 2(B) are a schematic view and a schematic vertical sectional view, respectively, showing the manner in which a thin film stream of a specific thickness being projected from the periphery of the rotating disk is split into linear streams of a specific radius immediately after the projections, and the manner in which the linear streams are further split into spherical droplets of a specific radius.
Figure 2B:
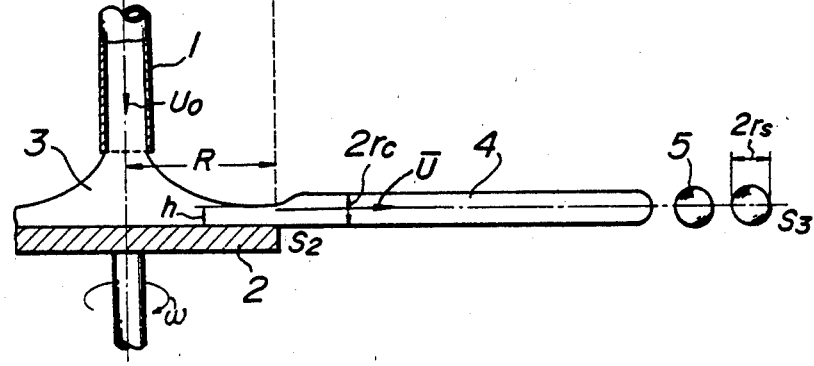

However, surface tension $\sigma$ (dyne/cm) is acting on the surface of the melt stream, so that it is impossible to maintain the state of infinite thin film. FIG. 2 illustrates the manner in which a thin film stream 3 of a velocity $\overline{U}$ and a thickness h is projected from the periphery of the disk with the radius R at an angle $\phi$ to the tangential direction; the thin film stream 3 is split into free linear streams 4 of a radius $r_c$ immediately after being projected; and the linear streams 4 are further split into spherical droplets 5 of a radius $r_s$. The condition for the thin film stream with surface tension $\sigma$ (dyne/cm) and thickness h (cm) to be split into linear streams of radius $r_c$ (cm) is given by the following equation:

$$r_c = \sigma/\Delta p$$

where $\Delta p$ (dyne/cm$^2$) is the pressure difference between the inside and the outside of the linear stream surface.

When the thin film stream consisting of a boundary layer with mean velocity components $\overline{U}_\theta$ and $\overline{U}_r$ is projected into space at the resultant velocity $\overline{U}$, the fluid friction between the disk and the stream vanishes suddenly, so that the velocity components of $\overline{U}_\theta$ and $\overline{U}_r$ with the direction perpendicular to the spatial velocity $\overline{U}$ must be balanced; namely, $\overline{V} = \overline{U}_\theta \sin\phi$ should balance $-\overline{V} = -\overline{U}_r \cos\phi$, as shown in FIG. 2. Accordingly, considering the rotation of the free linear stream, the pressure difference $\Delta p$ of the aforesaid equation can be given by the sum of a mean static pressure $r_c \rho g$ (dyne/cm$^2$) and a dynamic pressure $\overline{V}^2 \rho/2$ (dyne/cm$^2$), where $\rho$(g/cm$^3$) is the density of the melt, and g (cm/sec$^2$) the gravitational constant. Generally speaking, a thin film stream consisting of a turbulent boundary layer can be formed at a high speed rotation generating a large mean tangential velocity component $\overline{U}_\theta$, and the thickness h of such a film stream is very small. Under such conditions, the value of $r_c \rho g$ is considerably smaller than that of $\overline{V}^2 \rho/2$, and the approximation of $\Delta p = r_c \rho g + \overline{V}^2 \rho/2 \simeq \overline{V}^2 \rho/2$ can be adopted. Therefore, the condition for forming the linear stream of radius $r_c$ can be expressed as follows:

$$r_c = \frac{\sigma}{r_c \rho g + (\rho \overline{U}_\theta^2 \sin^2\phi/2)} \simeq \frac{2\sigma}{\rho \overline{U}_\theta^2 \sin^2\phi} \quad (11)$$

In addition, when the thin film stream of thickness h at the periphery of the disk with radius R is actually split into n of linear streams with radius $r_c$, the total cross sectional area of the thin film stream $2\pi R h$ must be substantially equivalent to the total sum of the linear stream cross sectional $n\pi r_c^2$, namely $$n\pi r_c^2 \simeq 2\pi R h$$

Furthermore, the total circumferential length of the thin film stream $2\pi r$ cannot be smaller than the total sum of linear stream diameters $2r_c n$, namely $$2r_c n \leq 2\pi R$$

From the aforesaid two conditions, the following relation can be derived:

$$r_c \geq 2h/\pi \quad (12)$$

When the condition of the relation (12) is satisfied, the formation of linear streams according to equation (11) can practically occur.

Figure 3:
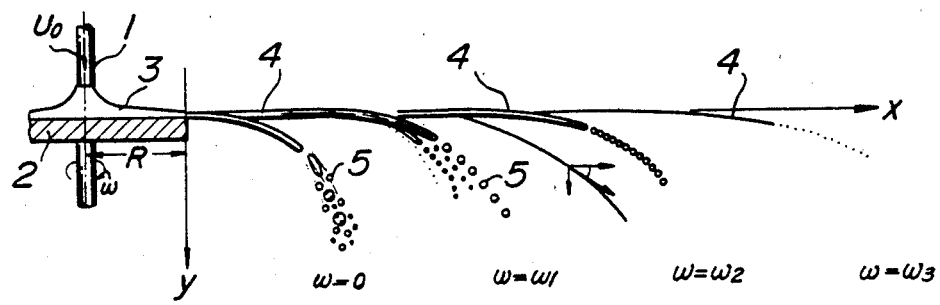
FIG. 3 is a schematic vertical sectional view, showing the manner in which, when a melt is introduced onto a rotating disk of a fixed radius, the path and the size of both the linear streams and the subsequently formed spherical droplets vary with the rotational speed of the rotating disk, at a fixed flow rate of the melt and a fixed disk diameter.
Figure 4A:
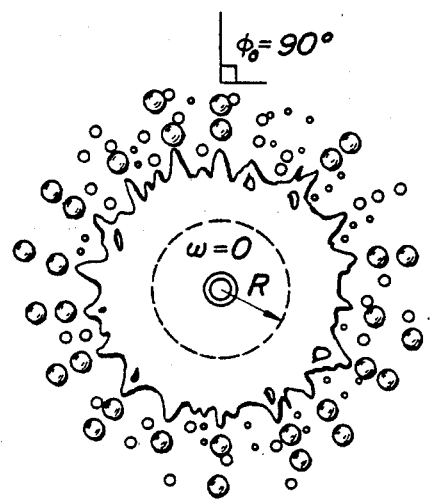
FIGS. 4(A), 4(B), 4(C) and 4(D) are schematic plan views of the melt streams of FIG. 3 at each different rotational speed of the rotating disk, respectively.
Figure 4B:
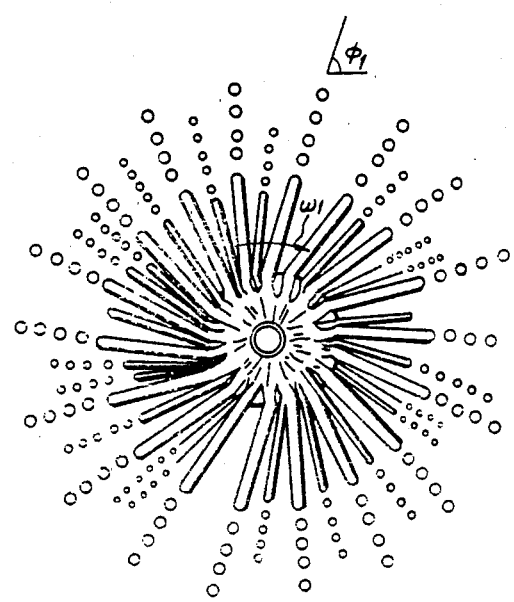
Figure 4C:
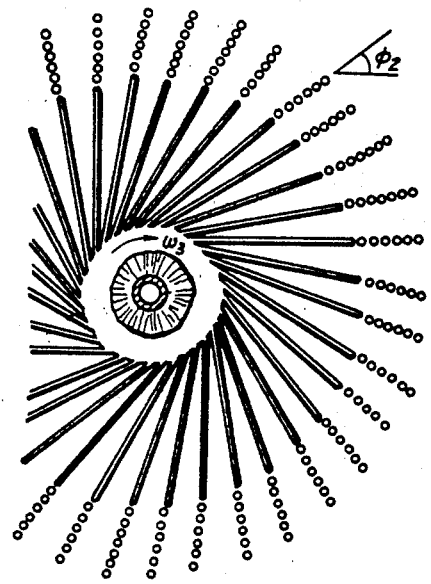
Figure 4D:
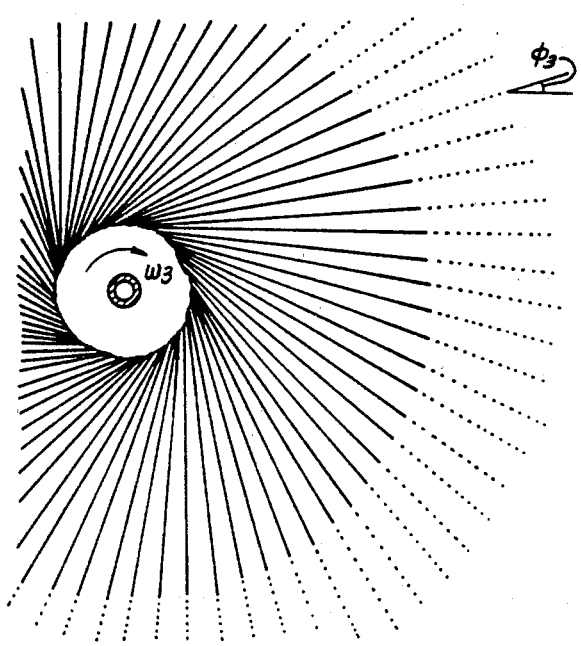

With a melt having a low kinematic viscosity $\nu$, the split of the thin film stream into linear streams can occur at a low rotational speed, even on the rotating disk (see the illustrations for $\omega = \omega_1$ in FIGS. 3 and 4). When the conditions of the relations (11) and (12) are satisfied on the disk, the mean tangential velocity component $\overline{U}_\theta$ is usually small and the angle $\phi$ is nearly 90 degrees. Then, such relations as $\overline{U}_\theta \sin\phi = \overline{U}_\theta$ and $\overline{U}_r = \overline{U}$ can be applicable and the formation of linear streams with a large radius $r_c$ can occur. The linear streams, thus formed on the rotating disk, can only move radially rolling on the disk. Though the linear streams of a large radius $r_c$ are formed on the disk, the radial coordinate r increases with the movement of the linear streams toward the periphery of the disk and the component $U_\theta \sin\phi$ also becomes large. This can be associated with such a phenomenon that the linear streams, approaching the periphery of the disk, are further split into linear streams of smaller radii $r_c$ according to equation (11) and then projected into space as linear streams with various radii. Hence, under the foregoing conditions, linear streams of a fixed size cannot be obtained.

Even with a rather high rotational speed, the mean tangential velocity component $\overline{U}_\theta$ is still small at positions of a small radial coordinate r, i.e., at positions near the center of the disk. This can be related to such conditions as $\overline{U}_\theta \sin\phi \simeq \overline{U}_\theta$ and $\overline{U}_r \simeq \overline{U}$ and causes the formation of thick linear streams near the disk center according to equations (11) and (12). However, as the streams approach the periphery of the disk, the mean tangential velocity component $U_\theta$ rapidly increases and the thickness h becomes smaller, so that simultaneously satisfying both equations (11) and (12) becomes impossible, and the linear streams on the disk are converted into a thin film stream (see the illustration for $\omega = \omega_2$ in FIGS. 3 and 4). In this case, a thin film stream with a fixed thickness h can be projected from the periphery of the disk, and free linear streams of a fixed radius $r_c$ can be formed according to equations (11) and (12).

When the rotational speed of the rotating disk is sufficiently high, the entire surface of the rotating disk is covered with a thin film stream of boundary layer, and free linear streams with a fixed radius $r_c$ can be formed. (See the illustrations for $\omega = \omega_3$ in FIGS. 2, 3 and 4.)

As to the split of the thin film stream into linear streams, the values of the thin film thickness h, the mean tangential velocity component $\overline{U}_\theta$, and the direction of the resultant velocity $\phi$ are determined by given values of angular velocity of the disk $\omega$, kinematic viscosity of the melt $\nu$, and the disk radius R. Then, the radius of the linear stream $r_c$ can be calculated by using these values in equation (11). However, when the thickness h is small enough to satisfy the relation (12), the split can actually occur. As for the further split of the free linear stream 4 of radius $r_c$ into spherical droplets 5, when the spherical particle volume $(4/3)\pi r_s^3$ is larger than the volume of the linear stream portion with a length $2r_s$, i.e., $\pi r_c^2 2r_s$, the formation of the spherical particle can actually occur. Such conditions can be expressed as follows:

$$r_s \geq \sqrt{3/2}\, r_c \quad (13)$$

Thus, the spherical droplet radius $r_s$ to be formed by the split of the linear stream with a fixed radius $r_c$ is always larger than the radius $r_c$, and formula (13) gives the minimum diameter of the spherical particle. The conditions for the formation of the spherical particle of radius $r_s$ (cm) can be given by the following equation as a function of the surface tension $\sigma$(dyne/cm) and the pressure difference between the inside and the outside of the spherical droplet surface $\Delta p$(dyne/cm$^2$)

$$r_s = 2\sigma/\Delta p$$

where the pressure difference $\Delta p$ is the sum of the mean static pressure $r_s \rho g$(dyne/cm$^2$) and the dynamic pressure $\rho \overline{U}^2/2$ due to the free linear stream velocity $\overline{U}$. The minimum radius of the spherical particle is determined as $r_{s.min} = \sqrt{3/2}\, r_c$ by formula (13). Therefore, when the velocity $\overline{U}$ is decelerated by the frictional resistance in an ambient gas to the valve $U_s$ satisfying the following equation, a spherical droplet with the given radius $r_s$ is formed:

$$r_s = \frac{2\sigma}{r_s \rho g + (\overline{\rho U_s^2}/2)} \simeq \frac{4\sigma}{\rho \overline{U_s^2}} \quad (14)$$

The spherical particle formed at the position of the velocity change $\overline{U} \to U_s$ continues its motion with an initial velocity $U_s$.

Now, referring to FIGS. 3 and 4, description will be made on the manner in which, when the melt is smoothly introduced onto the rotating disk 2 of a fixed radius R through the conduit 1 at a fixed outflow speed, the movements of the thin film stream on the disk, the linear streams and the spherical droplets vary corresponding to the applied angular velocity $\omega$. The flow lines for $\omega=0$, $\omega_1$, $\omega_2$ and $\omega_3$ shown in the vertical view of FIG. 3 correspond to the flow lines for respective values of $\omega$ shown in the plan view of FIG. 4. When the disk is at a standstill ($\omega=0$) and the melt is introduced at a sufficiently high flow rate, the melt flows out from the disk periphery in the form of free film streams. In this case, the mean tangential speed component $\overline{U}_\theta=0$ and the radius of the linear stream $r_c$ in equation (11) depends on the static pressure alone. Since the static pressure of the film varies with the thickness of the film stream, the film stream is locally broken to form holes and is further split into thick linear streams of various radii. The movements of the thick films and linear streams are rapidly turned to the gravitational falling motion. According to equations (13) and (14), the thick linear streams with various radii are split into large spherical droplets of various radii $r_s$. However, because of the presence of gravitation, a vertical velocity component $\overline{U}_y$ is generated in addition to the mean radial velocity component $\overline{U}_r$. This can also cause an increase of the resultant velocity $\overline{U}$, and accordingly, the spherical particles with large radii $r_s$ are further divided into smaller spherical droplets during space motion so as to meet the condition of equation (14). Thus, it becomes impossible to obtain any specifically sized linear streams or spherical particles. As long as the radius R and the angular velocity $\omega$ are comparatively small, similar phenomena can inevitably occur. The present invention does not deal with such phenomena which occur with comparatively small values of radius R and considerably low values of angular velocity $\omega$.

With a low-speed rotation of the disk ($\omega=\omega_1$), the mean tangential velocity component $\overline{U}_\theta$ is still small and the angle $\phi$ is close to 90 degrees in equation (11). Therefore, linear streams of a large radius $r_c$ are formed on the disk. As the linear streams proceed toward the periphery of the disk, the value of $\overline{U}_\theta \sin\phi$ increases, and linear streams with a small radius $r_c$ are separated therefrom before reaching the disk periphery. Consequently, free linear streams with various radii are projected from the disk periphery and move along various flow lines. This can also be associated with the variation of spherical particle radii determined by equations (13) and (14).

Even with a considerably rapid rotation of the disk ($\omega=\omega_2$), the conditions in the proximity of the disk center are similar to those of a rotating disk of a small radius producing the small mean tangential velocity component $\overline{U}_\theta$ and the large angle $\phi$, and linear streams with a large radius $r_c$ are formed on the disk in accordance with equation (11). However, with the increase of the radial coordinate r, the value $U_\theta \sin\phi$ increases to cause the formation of linear streams with a smaller radius $r_c$. As the streams further approach the disk periphery ($r \rightarrow R$), the conditions of the formulae (11) and (12) become unsatisfied and a thin film stream of turbulent boundary layer is formed. This thin film stream is projected from the disk periphery into space splitting into free linear streams of a fixed radius in accordance with the conditions of the formulae (11) and (12). The free linear streams are further split into spherical droplets of a fixed radius according to the conditions of the formulae (13) and (14).

With a sufficiently high-speed rotation of the disk ($\omega=\omega_3$), a thin film stream of boundary layer is formed over the entire disk surface. This film stream, being projected from the disk periphery at a high speed in the direction of a small angle $\phi$, is split into free linear streams of a fixed radius and then, further split into spherical droplets of a fixed radius.

As described above, in order to produce linear streams or spherical droplets of a fixed size, it is necessary to form a thin film stream of boundary layer, at least, in the proximity of the periphery of the disk, and hence, to rotate the disk at a considerably high angular velocity with a constant flow rate. Besides, in order to produce linear streams of a rather large fixed radius $r_c$ or spherical droplets of a rather large fixed radius $r_s$, it is necessary to prevent irregular split of the linear streams on the disk. To meet such needs it is reasonable to rotate a disk of a comparatively small radius R at a high speed, as apparent from the foregoing explanation. With the conventional process using a comparatively slow rotational speed, e.g., 1,500 to 500 r.p.m. for a disk diameter of 50 to 200 mm, it is difficult to produce a turbulent boundary layer, and linear streams or spherical droplets of a fixed radius.

In FIG. 3, such rectangular coordinate axes are taken that the origin O' is on the periphery of the disk; the horizontal direction of the projected linear stream with an angle $\phi$ is the x-axis; and the downward vertical direction is the y-axis. The velocity of the linear stream or the spherical particle at an arbitrary point in the x-y plane is represented by u, and its velocity components in the x and y directions are represented by $u_x$ and $u_y$, respectively, and the angle between u and $u_x$ is represented by $\alpha$. The initial velocity at the origin O' in the aforesaid two-dimensional motion is equal to the velocity $\overline{U}$ given by equation (8). The equation of motion is given as follows, where $d_c$(cm) ($=2r_s$) is diameter of the spherical particle, $\theta$ (sec) time elapsed, g gravitational constant and $\phi$ (g) drag or resistance caused by ambient static fluid with density $\rho_f$(g/cm$^3$):

$$\left.\begin{aligned} \rho\frac{\pi d_s^3}{6}\cdot\frac{du_x}{d\theta} &= -(\phi\cos\alpha)g \\ \rho\frac{\pi d_s^3}{6}\cdot\frac{du_y}{d\theta} &= \frac{\pi d_s^3}{6}(\rho-\rho_f)g-(\phi\sin\alpha) \end{aligned}\right\} \quad (15)$$

Here, $u_x=u\cdot\cos\alpha$, $u_y=u\cdot\sin\alpha$, $u^2=u_x^2+u_y^2$, and the drag $\phi$ can be given by the following equation, provided that the cross-sectional area of the particle is $Ap(=\pi d_s^2/4)$ and the drag coefficient is $C_D$:

$$\phi = C_D \cdot Ap \frac{u^2}{2g} \rho_f \qquad (16)$$

The drag coefficient $C_D$ is a dimensionless number determined by Reynolds number $Re = d_s u/\nu_f$ ($\nu_f$ being the kinematic viscosity of the static fluid). The values of $C_D$ for technical calculation are known as a function of Re in various simple shapes of solid. For the motion of the linear stream with radius $r_c$, the drag $\Phi$ acting at its foremost tip can be approximated by the equation (16) by assuming the tip as a sphere of the radius $r = \sqrt{3/2} \cdot r_c$ according to the formula (13). The analytical solution of equation (15) cannot be obtained, because the angle $\alpha$ varies with time and the drag coefficient $C_D$ varies with the velocity u. However, the solution can be solved by the so-called successive approximation method. More particularly, when the initial velocity $(u)_{\theta=0} = \overline{U}$ is given, the changes of the velocity $(u_x, u_y, u)$ and the position (x, y) with the time elapsed can be determined by said method. The position where the linear stream is split into spherical droplets can be determined as the point where the velocity u decelerates to the value of $\overline{U}_s$ in equation (14). Thus, the paths of motion and the positions for forming the spherical droplets in FIGS. 3 and 4 can be quantitatively determined by solving equation (15).

The torque T (kg·m) required for rotating the disk can be calculated by the following equation, when using radius R (m) of the disk, gravitational constant g (m/sec²), density of the melt p (kg/m³) and drag coefficient $C_f$:

$$T = C_f \frac{\omega^2 R^5}{2g} \cdot \rho \qquad (17)$$

Accordingly, the horsepower H (P.S.) required for driving the disk at a rotational speed N (r.p.m.) is given by the following equation:

$$H = \frac{2N}{60} \cdot T/75 \qquad (18)$$

When a turbulent boundary layer is formed on the rotating disk, the following equation is known for estimating the drag coefficient $C_f$ included in equation (17) as a function of the Reynolds number $Re = \omega R^2/\nu$:

$$C_f = \frac{0.0728}{(Re)^{1/5}} \qquad (19)$$

Thus, the torque T and the power H can be calculated by equations (17) through (19) provided that the angular velocity $\omega$, the radius R, the kinematic viscosity $\nu$, and the density p are known.

Equations (4) through (16) and equation (19) are applicable to turbulent boundary layers formed on the rotating disk under the conditions of equations (2) and (3). According to equation (3), the turbulent boundary thickness $\delta$ increases in proportion to $r^{3/5}$. Generally speaking, therefore, melts with lower values of kinematic viscosity $\nu$, can form stable thin film streams of the turbulent boundary layer on the disk surface near the periphery, when Reynolds number $Re = \omega R^2/\nu$ is increased to the values in the turbulent flow range by applying higher rotational speeds. However, with melts having high kinematic viscosity $\nu$, the laminar boundary layer thickness $\delta'$ can become considerably large even at lower rotational speeds and is independent of the radial coordinate r. Accordingly, at comparatively slow rotational speeds, i.e., within the laminar boundary layer range of the Reynolds number $Re = \omega R^2/\nu$, stable thin film streams of boundary layer can be formed on the disk. When using film streams of the laminar boundary layer, the velocity components $U_\theta$ and $U_r$ are determined by the following equations instead of equations (4) and (5), and the thickness $\delta'$, instead of the thickness $\delta$, must be used in equations (6), (7), and (10).

$$\frac{U_\theta}{\omega r} = \left\{ 1 - \left(\frac{z}{\delta'}\right) \right\}^2 \qquad (4)'$$

$$\frac{U_r}{\omega r} = 1.315 \left\{ \left(\frac{z}{\delta'}\right) - 2\left(\frac{z}{\delta'}\right)^2 + \left(\frac{z}{\delta'}\right)^3 \right\} \qquad (5)'$$

The drag coefficient $C_f$ in equation (17) must also be determined by the following equation relating to the laminar flow, instead of equation (19).

$$C_f = \frac{1.935}{(Re)^{\frac{1}{2}}} \qquad (19)'$$

Accordingly, even when film streams of the laminar boundary layer given by equations (2)' and (3)' are formed, theoretical calculations can be performed in similar procedures to those for the turbulent boundary layer.

As explained above, the inventors have disclosed the theory of the formation of linear flow and spherical droplets on the assumption that the melt is always maintained at a constant temperature without being solidified and that the ambient atmosphere is a static gas of a fixed temperature and a fixed pressure. In the aforesaid formation, if the linear streams of a fixed size are solidified as they are, long fibers of the fixed size can be obtained, while if the solidification is completed after each linear streams is split into spherical droplets of a fixed size, spherical particles of the fixed size can be obtained.

When a high temperature melt is treated by using a rotating disk, the temperature rise of the ambient gas causes its convection current and subsequent change in properties of the gas. This can be associated with the variation of the drag $\Phi$ in equation (16). When a gas of a selected temperature is blown to form gas streams with the velocity $u_f$ and the paralleled but opposite directions to those of the aforesaid free linear streams of the melt, the drag $\Phi$ in equation (16) is increased to a value which corresponds to the melt velocity $u + u_f$ instead of u. The drag $\Phi$ in equation (16) is also increased by reducing the gas temperature or increasing the gas pressure, i.e., by increasing the gas density $\rho_f$. The increase of the drag $\Phi$ causes shortening of the time required for the initial velocity of the linear stream $(u)_{\theta=0} = \overline{U}$ to be decelerated to the droplet formation velocity $\overline{U}_s$ in equation (14). This quickens the formation of the spherical droplets and reduces the moving distance thereof. If a rational flow of the gas is applied, the change in properties of the gas can also be considerably suppressed.

On the other hand, when a gas of a selected temperature is blown to form gas streams with the velocity $u_f$ and the parallel directions to those of the aforesaid free linear streams of the melt, the drag $\Phi$ in equation (16) is reduced to a value which corresponds to the melt velocity $u-u_f$ instead of u. The drag $\Phi$ in equation (16) is also decreased by increasing the gas temperature or reducing the gas pressure, i.e., by decreasing the gas density $\rho_f$. The reduction of the drag $\Phi$ causes the delay of the deceleration of the initial linear stream velocity $\bar{U}$ and contributes to preventing the formation of spherical droplets.

The motion of the linear streams projected at a high speed from the disk periphery in the direction of an angle $\phi$, gradually changes from the horizontal movement to the vertical dropping. Therefore, for successful coincidence of the gas stream direction with the melt stream direction, the horizontal parallel or counter flow of the gas stream should be formed in the region where nearly horizontal motion of the melt streams is still proceeding. In the prior inventions using rotating bodies, gases are often blown in irrational directions. But this can only cause irregular cutting off of linear streams (fibers) or irregular split of spherical droplets (particles). Accordingly, when using the gas flow with the present invention, the direction and the velocity of the gas stream must be rationally selected so as to meet the successful control of the drag $\Phi$ in equations (15) and (16).

In general, silicate melts can easily form stable fine linear streams and can successfully be solidified as fibers because of their high viscosity and low surface tension values. Conversely, metallic melts having low viscosity and high surface tension values, tend to form rather thick linear streams. And under cooling rates most commonly used, the metallic linear streams can easily be solidified after being split into spherical droplets during the space motion. This is the reason why the prior inventions are rather distinctly classified into two categories, i.e., the production of fibers from easily vitrifiable non-metallic melts and the production of spherical or globular particles from metallic melts. However, even with silicate melts, the viscosity can be decreased by high temperature heating and the drag $\Phi$ can be increased by applying counter current streams of hot gas. This can cause the delay of solidification and the formation of spherical droplets of the silicate melts. On the contrary, even with metallic melts, the surface tension can be considerably decreased by high temperature heating or adding surface-tension-reducer elements such as S, Se, Sb, La, Ce, B, Sn, O, etc. And when the cold gas streams are in parallel with the linear melt stream, the drag $\Phi$ is decreased and the solidification is accelerated. Under these conditions, the metallic melts may be solidified as fibers.

The aforesaid principles of the present invention can be summarized as follows.

(1) For a given flow rate of the melt, the radius R and the angular velocity $\omega$ of the disk are selected by considering the kinematic viscosity $\nu$, so as to form a thin film stream of boundary layer of a specially fixed thickness h at the periphery of the disk.

(2) When the thin film stream is projected from the periphery of the disk, free linear streams of a fixed radius $r_c$ determined by the aforesaid specific thickness h are formed by the action of the surface tension $\sigma$.

(3) The linear streams of the radius $r_c$ are split into spherical droplets of a fixed radius $r_s$ determined by the stream radius $r_c$, by the action of the drag $\Phi$ caused by ambient gas.

(4) To accelerate the formation of spherical droplets and to shorten the distance of the stream or droplet motion, the drag $\Phi$ should be increased by blowing horizontal gas flows exactly in the opposite direction to that of the linear streams, or by reducing the gas temperature or increasing the gas pressure. To prevent the cutting-off of fibers and to prevent the formation of spherical particles, the drag $\Phi$ should be reduced by blowing horizontal gas flows exactly in the same direction as that of the linear streams, or by increasing the gas temperature or reducing the gas pressure.

(5) All the aforesaid steps can be quantitatively determined by theoretical calculations.

The present invention is based on the aforesaid theory developed by the research of the inventors, and includes a process for producing spherical particles or fibers with a specially fixed size.

According to an embodiment of the present invention, a process is provided for producing spherical particles with a specially fixed size from a melt, characterized by introducing the melt through a conduit fitted to a tundish bottom onto a rotating disk at a predetermined flow rate; forming a thin film stream of said melt with a specific thickness, at least, in the proximity of the periphery of said disk; providing said thin film stream with a tangential velocity component as well as a radial velocity component throughout the entire thickness thereof; selecting a diameter and a rotational speed of said disk according to the kinematic viscosity of said melt; projecting said thin film stream into space from the periphery of said disk; causing said thin film stream to be split into free linear streams with a fixed radius by the termination of said tangential velocity component and the additional action of surface tension; and solidifying said projected free linear streams after said free linear streams are split into spherical droplets with a fixed radius by the reduction of the space motion and the action of surface tension.

In practicing the process for producing spherical particles according to the present invention, in order to form a stable thin film stream on the disk without turbulence, the condition of equation (1) should be duly considered. More particularly, the outlet of a conduit introducing the melt onto the center of the rotating disk should preferably be fixed so that the distance between said outlet and disk surface $h_o$ is in the range of $r_o/2$ to $(r_o/2)+2$ mm, where $r_o$ is the radius of the conduit outlet opening in mm. If the distance $h_o$ is smaller than $r_o/2$, the melt tends to swell around the aforesaid conduit outlet, while if the distance $h_o$ exceeds $(r_o/2)+2$ mm, the free falling stream from the outlet strikes directly the disk surface causing unfavorable turbulence of the thin film stream.

Figure 5A:
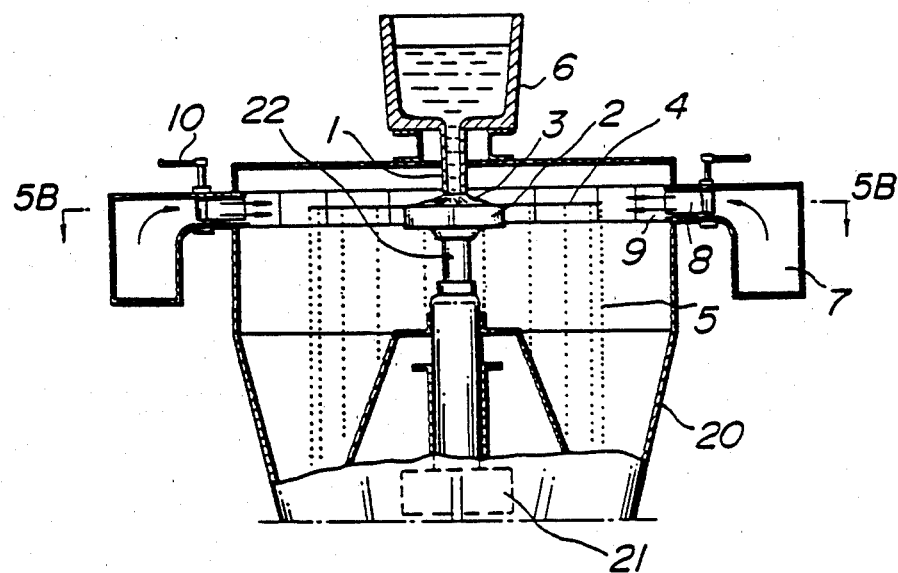
FIGS. 5(A) and 5(B) are a schematic vertical sectional view and a schematic plan view, respectively, of an apparatus for producing spherical particles according to the process of the present invention, in which horizontal gas jets with the opposite directions to those of said linear streams are additionally applied.
Figure 5B:
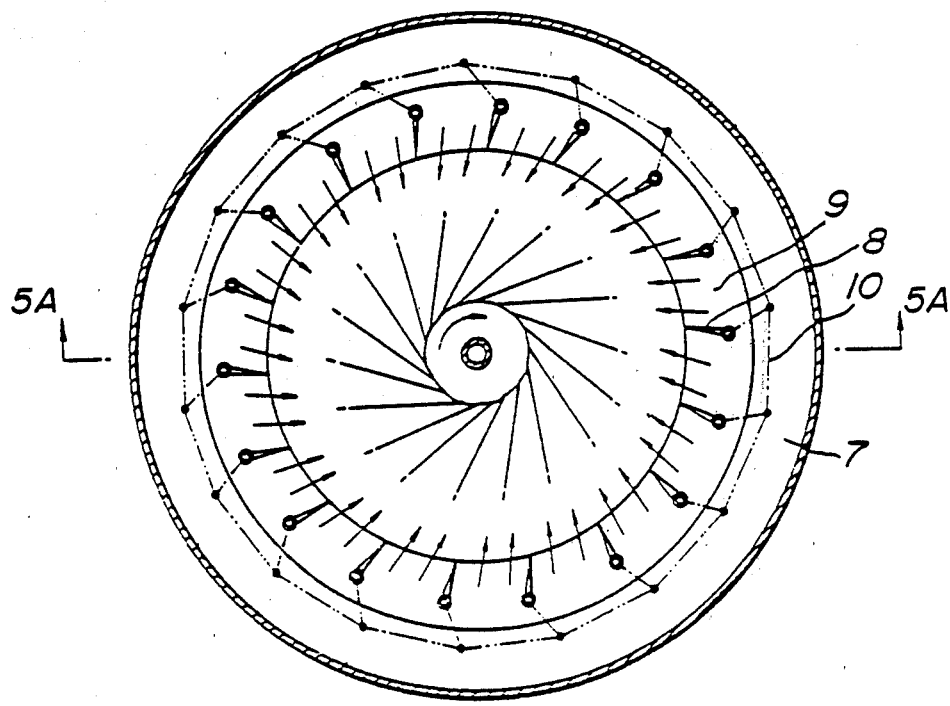

In the production of spherical particles according to the present invention, it is possible to accelerate the formation of the spherical droplets, to prevent the formation of fibers, and to shorten the distance of space motion, by injecting a gas having an atmospheric or higher pressure as well as a room or lower temperature in a direction opposite to that of the projected linear streams from the periphery of the disk. FIGS. 5A and 5B show an example of an apparatus using the aforesaid injection of gas. The gas introduced into an annular gas main 7 is injected from an annular slit 9 having a plurality of guide plates 8 for controlling the direction, forming horizontal gas streams with the direction opposite to that of the horizontal motion of the linear streams. The plurality of guide plates 8 are connected to each other by a link mechanism 10, so that the angles thereof, i.e., the gas injecting direction, can be simultaneously adjusted. With this arrangement, the injected gas flows exactly in the opposite direction to the linear streams of a specific radius projected from the disk, and it becomes possible to cause the spherical droplets to fall at selected radial positions in space, by controlling the velocity of gas flow.

In the process for producing spherical particles according to the present invention, when a melt suspended by certain solid or liquid particles is introduced onto a rotating disk, the solid or liquid particles can be separated from said melt while the spherical particles of said melt can also be produced. For instance, if a low viscosity basic slag suspended by metallic solid particles or a low viscosity melt suspended by its primary crystals is introduced onto a rotating disk, the suspended particles can be separately collected from the particles of the melt because the path of spatial motion of the suspended particles or crystals is different from that of the linear melt streams or spherical droplets.

According to another embodiment of the present invention, a process is provided for producing long fibers with a specially fixed radius from a melt of organic or inorganic materials including metals, slags, or fluxes, by introducing the melt through a conduit onto a rotatating disk at a predetermined flow rate; forming a thin film stream of said melt with a specific thickness, at least, in the proximity of periphery of said disk; providing said thin film stream with a tangential velocity component as well as a radial velocity component throughout the entire thickness thereof; selecting a diameter and a rotational speed of said disk according to kinematic viscosity of said melt; projecting said thin film stream into space from the periphery of said disk; causing said thin film stream to be split into free linear streams with a fixed radius by the termination of said tangential velocity component and the additional action of surface tension; and solidifying said free linear streams; wherein a gas having an atmospheric or lower pressure as well as a room or higher temperature may be used for producing gas streams directed to the same direction as that of said linear streams.

Figure 6:
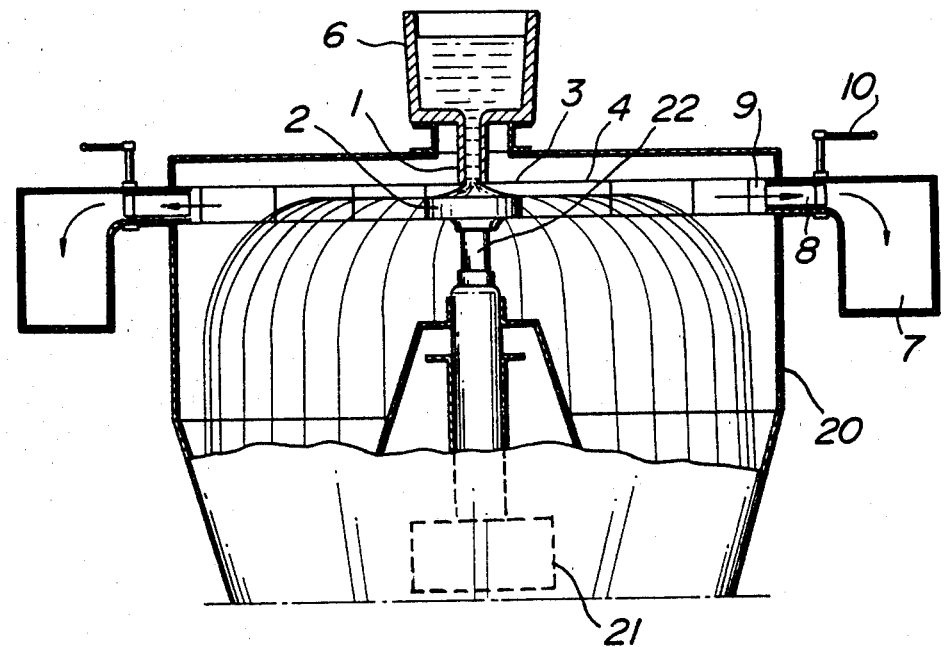
FIG. 6 is a schematic sectional view of an apparatus for producing fibers according to the process of the present invention, in which horizontal gas jets with the same directions as those of the linear streams of the melt are additionally applied.

For instance, the melts of some silicate fluxes and basic blast furnace slags, which are described hereinafter in "Examples 2 and 3", respectively, tend to become spherical particles if being introduced on the rotating disk at a rather high temperature with a low viscosity, or tend to become fibers if being introduced at a rather low temperature with a high viscosity, as long as the cooling rates in the room temperature atmosphere are applied. With such silicate melts, the change of the surface tension values with temperature is negligibly small. When linear streams of such melt with a fixed size are projected into static gas from the periphery of a disk for the purpose of producing fibers, unfavorable formation of spherical droplets tends to locally occur, particularly during the starting period of flowing the melt. This is because the gas temperature is still low and the gas density is correspondingly high in the starting period. Besides, the sedimentation rate of fibers in the air is very slow as compared with that of spherical particles. The produced fibers, therefore, tend to be easily entangled. The aforesaid use of the gas flows in the same direction as that of the linear streams of the melt is highly effective for reducing the droplet formation and the fiber entanglement, and enables the production of longer fibers. FIG. 6 illustrates an example of apparatus using the aforesaid gas flows. In the apparatus shown in FIG. 6, the direction of the gas flow in the apparatus shown in FIG. 5 is reversed; namely, in FIG. 6, the gas is drawn as horizontal gas flows to the same directions as those of the linear streams by means of an annular slit 9 having a plurality of guide plates 8, and gas thus drawn flows out through an annular gas main 7. In this event, a large deviation of the gas flow direction from that of the linear melt stream, may promote rather unfavorable cutting-off of the fibers. Thus, the direction of the gas flows is controlled by a number of guide plates 8.

In the process of producing fibers according to the present invention, if the radius of the conduit outlet opening for introducing the melt onto the center of the rotary disk is represented by $r_o$ and the distance between the aforesaid disk and the aforesaid outlet opening is represented by $h_o$, then the distance $h_o$ is preferably in the range of from $r_o/2$ to $(r_o/2)+2$ mm, as in the aforesaid process for producing spherical particles.

With the process for producing fibers according to the present invention, when a melt suspended by certain solid or liquid particles is introduced onto a rotating disk, the solid or liquid particles can be separated from said melt, while the fibers of said melt can also be produced. For instance, when a melt of cupola slag or blast furnace slag suspended by cast iron or pig iron droplets is introduced onto a rotating disk, the suspended heavy iron particles may be dropped with shorter space motion distances, while the free linear streams of the molten slag can be solidified as fibers. The iron particles and the slag fibers, therefore, may be separately collected.

The process for producing spherical particles and fibers according to the present invention is based on the studies concerning the quantitative control of the thickness of "the thin film stream of boundary layer", i.e., "the thin film stream provided with a tangential velocity component as well as a radial velocity component throughout the entire thickness". When the kinematic viscosity of melts is comparatively high and the required radius of spherical particles or fibers is comparatively large, a thin film stream of "laminar boundary layer" should be formed on the rotating disk, while when the kinematic viscosity is low and the required radius is small, a thin film stream of "turbulent boundary layer" should be formed on the rotating disk. The aforesaid thin film stream cannot be formed when a disk with small radius is rotated at a rather slow speed. The inventors have carried out experiments on both the low-viscosity fluids such as water, aqueous solution of glycerine, various molten metals, etc., and the high-viscosity fluids such as metallurgical slags, synthetic fluxes, etc., by using disks with radii of 25 to 150 mm, and by driving the disks at a rotational speed range of 3,000 r.p.m. to 30,000 r.p.m. Whereby, the inventors confirmed, through theoretical calculations and experiments, that it is possible to control over a wide range, "the thickness of the thin film stream of boundary layer" and accordingly, "the radius of the spherical particle or fiber" formed by the split of the thin film stream. Based on such results obtained, the present invention uses a range of considerably higher rotational speeds of the disk, as compared with that in conventional prior art processes. Furthermore, the application of the aforesaid higher rotational speeds enables the treatment of a large amount of melts even with the use of disks of comparatively small radii.

When treating high temperature melts by a rotating disk, large centrifugal stress is generated in the disk which is heated to a high temperature. Furthermore, at the beginning and the end of the treatment, thermal shock stress is inevitably generated by rapid heating and rapid cooling of the disk surface, respectively. Metals and alloys having high thermal conductivity and deformability are hardly fractured by the thermal shock stress. However, even in heat-resisting steels, the creep strength rapidly decreases at temperatures higher than 600° C. The disk of metallic materials, therefore, may be easily fractured by the centrifugal stress at high rotational speeds and high temperatures of the disk and cannot be fit for long use. Even the "super alloys" have allowable temperature limits of less than 800° C. Thus, for treating a large amount of melts, refractory or ceramic materials must be used as materials of the disk. However, basic firebricks and fire-clay bricks, such as magnesite bricks and chamotte bricks, having low softening temperatures and large thermal expansion rates, cannot meet the expected high centrifugal and thermal shock stresses. Fused silica blocks and graphite blocks have very small thermal expansion rates, rather larger high temperature strengths and excellent thermal-shock-resistances. But the tensile strength of those refractory bricks is very small as compared with the compressive strength thereof and therefore those bricks are hardly applicable to high-speed rotation accompanied with large centrifugal tensile forces. Because of these difficulties, most of the prior art processes are limited only to treat a small quantity of melts at a lower revolution speed than 3,000 r.p.m.

The treatment of a large amount of high temperature melts according to the present invention becomes possible only with the development of the disk which meets such severe conditions as high speed rotations at high temperatures. The inventors analyzed thermal impact stresses generated at the rapid heating and cooling of the disk surface and the centrifugal stresses generated at a high-speed rotation of the disk. On the basis of the analytical results, the inventors have succeeded in developing a rational construction of a rotor unit having a rotating disk surface of a required radius, by considering the high temperature strengths of materials. The construction is such that blocks of refractory materials and a holder of heat resisting steels are united into one rotor unit by mutual fitting.

Figure 7:
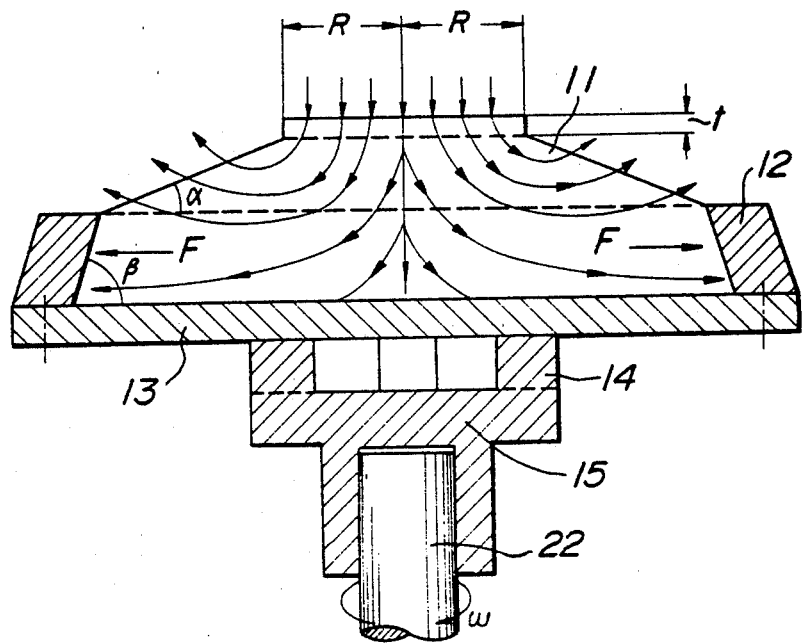
FIG. 7 is a schematic vertical sectional view, showing the principles of a rotor unit which can be used in a process for producing spherical particles or fibers according to the present invention.

Accordingly, an embodiment of the present invention additionally relates to a rotor unit having a disk surface of a selected refractory material and withstanding the high-speed rotation at high temperatures. FIG. 7 illustrates the principles for constructing a rotor unit which can be used for the production process of spherical particles and fibers according to the present invention. And FIGS. 8 and 9 show different embodiments of the rotor unit, respectively. Referring to FIG. 7, a disk block of fused silica 11 has a top portion of short cylindrical shape with a required disk radius R and a height of 1 to 2 mm; an intermediate portion of truncated cone shape with a gently sloped conical surface having an inclination angle α of 12 to 35 degrees; and a bottom portion of truncated cone shape with a steeply sloped side wall having an inclination angle β of 60 to 80 degrees. The heat transferred to the top surface of the disk with the radius R flows along the stream lines shown by the arrows in FIG. 7, and a large amount of heat is released in the atmosphere from the gently sloped conical surface of the intermediate portion of the truncated cone shape, while only a small amount of the heat reaches a side ring 12 and a bottom plate 13 of a holder made of heat-resisting steel. In other words, the intermediate portion of the disk block effectively prevents the temperature rise of the holder made of heat-resisting steel. The refractory materials usually have high compressive strength in spite of their extremely low tensile strengths. The thermal stress near the disk surface can be reduced by preheating at a high temperature. However, even the fused silica, having the highest high-temperature strength among industrial refractories, can hardly withstand the centrifugal stress generated by the high-speed rotation. Accordingly, the disk block 11 is fitted in the holder made of heat-resisting steel, which consists of the side ring 12 with a sufficient wall thickness and the bottom plate 13, as shown in FIG. 7. In this construction, when cracks or fractures are locally formed in the disk block, the gently sloped conical surface of the intermediate portion ensures that the centrifugal load F can be supported by the side ring 12 and the fractured refractory pieces are held in the holder. More particularly, the gently sloped surface of the intermediate portion with a truncated cone shape is necessary for preventing excessive temperature rise of the heat-resisting steel holder so as to maintain a sufficient creep strength. The steeply sloped side wall of the bottom portion with a truncated cone shape, being fitted to the side ring inside wall, can effectively prevent the escape of the disk block 11 from the holder, caused by floating tendencies of the block at high speed rotation. Furthermore, as shown in FIGS. 8 and 9 (not shown in FIG. 7), a plurality of grooves 11c are formed on the peripheral side wall of the bottom portion at regular intervals. The side ring 12 has a plurality of protuberances 12a on its inside wall corresponding to the grooves 11c on the peripheral side wall of the bottom portion. The mutual engagement of the grooves 11c and the protuberances 12a prevents "racing of the holder" against the fitted disk block due to mutual disengagement. The cylindrical side surface of the vertical cylinder with a height of 1 to 2 mm at the top of the disk block 11 is necessary for exactly projecting the "thin film stream of boundary layer" of the melt from the disk periphery into space at a fixed thickness, that is to say, for causing "complete separation of the boundary layer" at the periphery surface of the disk.

The refractory material for the disk block is selected from the group consisting of fused silica, graphite, silicon carbide, silicon nitride, zircon, chamotte, alumina, magnesia, and the like, considering the melt temperature, the melt wettability to the refractory surface, and the errosion resistance to the melt.

Besides, in order to prevent more effectively the temperature rise of the side ring 12 and the bottom plate 13 of the holder, the embodiments of FIGS. 8 and 9 use a heat-insulating firebrick layer 16 attached to the bottom surface of the disk block 11, and a mat of heat-insulating fibrous materials 17 attached to the bottom surface of said brick layer 16. The gap between the side ring 12 and the block 11 is filled with castable refractory 18, so as to unite the aforesaid parts into one rotor unit.

The industrial refractory having large high-temperature strength and high thermal shock resistance, next to those of fused silica, is graphite. Graphite, however, has high thermal conductivity. When using the disk block of graphite only with the shape shown in FIG. 8, the side ring 12 may be in danger of being overheated. The high-temperature strength and the thermal shock resistance of any other refractories are extremely lower than those of fused silica and graphite. Consequently, the one block construction of any refractory except fused silica as shown in FIG. 8 cannot be used when the melt temperature is high. Thus, the combined block as shown in FIG. 9 should necessarily be used instead of the disk block 11. Said combined block consists of a center block 11a of a selected refractory other than the fused silica, a surrounding block of fused silica 11b and, if necessary, a neutral refractory plate 19. The blocks and the plate, 11a, 11b and 19 are mutually fitted so as to form said combined block having the shape as that of the disk block shown in FIGS. 7 and 8. The center block 11a has a short cylindrical shape with a height of 1 to 2 mm, while its lower portion is a cylinder with a regular polygonal section and the sectional area is smaller than that of the top cylindrical portion. The surrounding block of fused silica 11b has a central hole with the same polygonal section dimensions as those of the lower portion section of the center block 11a. The neutral refractory plate 19 is, if necessary, attached to the bottom surface of said center block 11a. The combined block is formed by fitting the center block 11a and the neutral refractory plate 19 into the hole of the surrounding block of fused silica 11b. The aforesaid combined block shown in FIG. 9 is fitted into a holder of heat-resisting steel consisting of a side ring 12 and a bottom plate 13, together with a heat-insulating firebrick layer 16 and a mat of heat-insulating fibrous materials 17, and fixed by filling a castable refractory 18, as in the rotor unit using the unitary disk block as shown in FIG. 9.

As shown in FIGS. 7, 8A, 8B and 9A, 9B, the bottom plate 13 of the aforesaid holder has short legs 14 projected downwardly from the bottom surface around the center at regular intervals. The short legs 14 are fixed to a boss 15 forming a definite space between the bottom plate 13 and the boss 15. A turbulent gas flow through the aforesaid space is produced by the disk rotation and effectively suppress the excessive temperature rise of the bottom plate 13 and the boss 15. Furthermore, the boss 15 is mounted on a shaft by involutes spline coupling, so that exchange of the rotor unit can be quickly carried out.

Figure 8A:
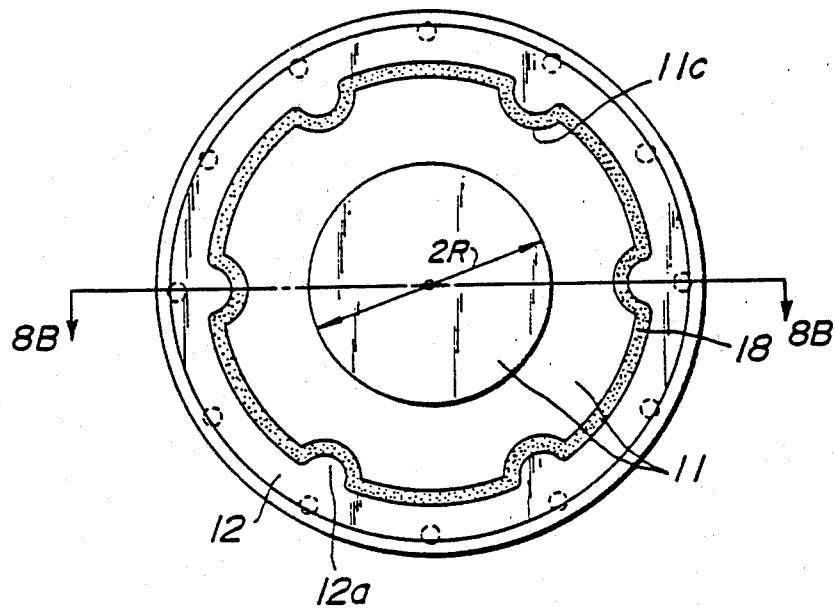
FIGS. 8(A) and 8(B) are a schematic plan view and a schematic vertical sectional view, respectively, of an embodiment of the rotor unit of FIG. 7.
Figure 8B:
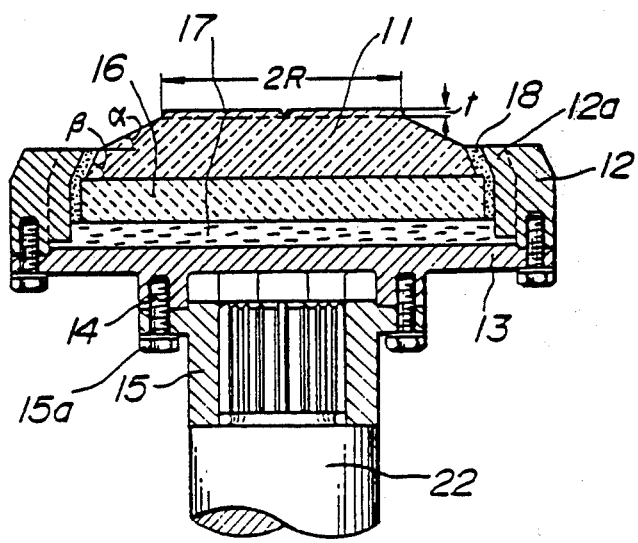
Figure 9A:
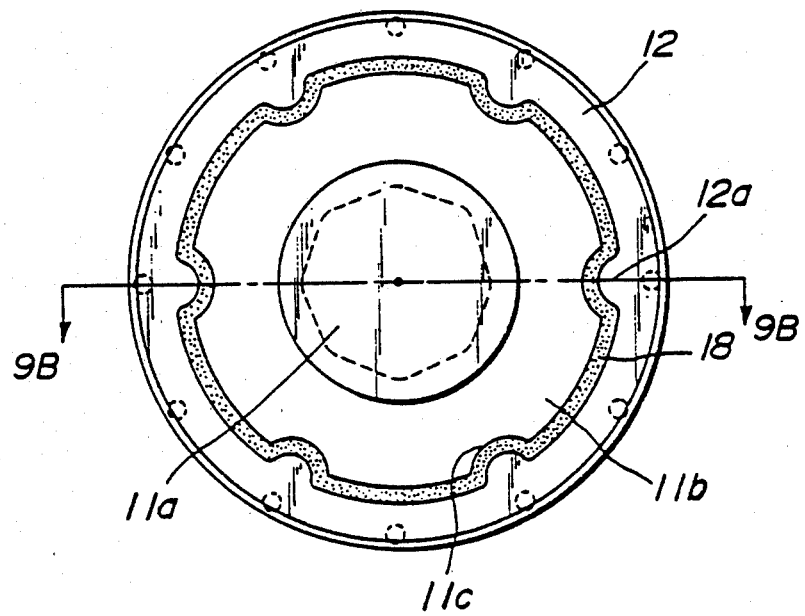
FIGS. 9(A) and 9(B) are a schematic plan view and a schematic vertical sectional view, respectively, of another embodiment of the rotor unit of FIG. 7.
Figure 9B:
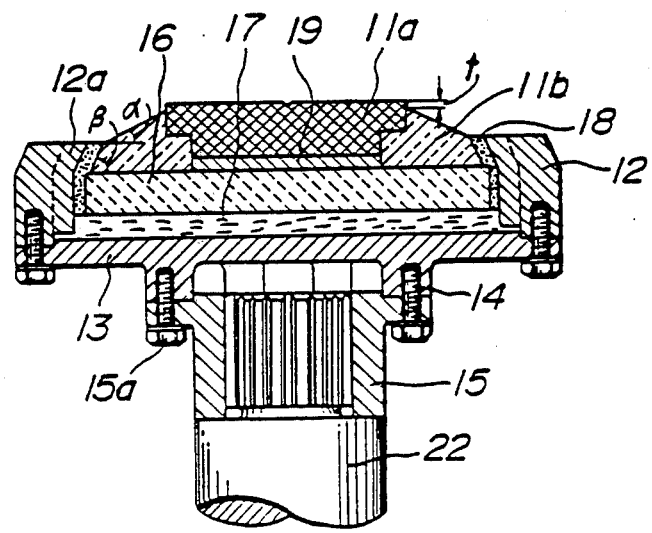

The inventors have confirmed through tests that, when a melt of molten steel at 1,600° C. was treated for a long period by using a rotor unit having the disk block of fused silica 11 and the construction shown in FIG. 8A and 8B, the temperature of the side ring 12 of the holder was kept below 500° C. and the temperature of the bottom plate 13 was also kept below 350° C. Therefore, the heat-resisting steel and the boss material could maintain sufficiently high creep strengths.

The present invention can be applied to a wide variety of fields. More particularly, the process for producing fibers according to the present invention can be applied to metallurgical slags containing a considerable amount of silica, such as pig iron making blast furnace slag, pig iron making electric furnace slag, and cast iron melting cupola or electric furnace slag; synthesized products of various inorganic substances, such as glass, mineral fibers, various metallurgical fluxes, refractory silicates, and borates; metals containing elements which greatly reduce the surface tension; semiconductive materials, such as silicon; and organic substances, such as synthetic resin.

The process for producing spherical particles according to the present invention can be applied to metallurgical slags, such as pig iron making blast furnace slag, pig iron making electric furnace slag, cast iron melting cupola or electric furnace slag, and basic oxygen converter slag; electromagnetic material requiring pulverization into particles or powder; iron, steel, non-ferrous metal, and alloy thereof, e.g., carbon steel, special steel, cast iron, aluminum, copper, magnesium, and zinc; ferroalloys, such as ferromanganese, ferrosilicon, ferrochromium, and ferronickel; and organic substances, such as synthetic resin.

The invention will now be explained in further detail by referring to examples.

EXAMPLE 1

Production of spherical steel particles

A rotor unit was driven by a hydrostatic transmission appartus consisting of a hydraulic oil pump with a variable oil delivery rate and a hydraulic oil motor with a fixed capacity, and the hydraulic oil pump was driven by an electric motor with an output of 30 kW. The rotational speed of the disk was directly detected by a photoelectric probe and automatically controlled at a constant value with the control action of PI by an electronic control system. The control range of rotational speed was 2,000 to 12,000 r.p.m. A conduit of fused silica having an outlet opening diameter $d_o = 20$ mm was used, and molten steel was poured into a tundish so as to keep the head of the molten steel at 700 mm. Under such conditions, the molten steel was introduced onto the center of the rotating disk, at a mass-flow rate of about 490 kg/min. The composition, the temperature, the density, the kinematic viscosity, and the surface tension of the molten steel were as follows.

Composition of the molten steel: 1.0% carbon (C),
 1.0% silicon (Si), 1.0% manganese (Mn),
 0.03% phosphor (P), 0.02% sulphur (S),
 0.008% oxygen (O), 0.15% copper (Cu)
Temperature of the molten steel: 1,500° C.
Density of the molten steel: 7.0 g/cm$^3$
Kinematic viscosity of the molten steel: $0.93 \times 10^{-2}$ cm$^2$/sec
Surface tension of the molten steel: 1,176 dyne/cm The rotating disk was made of fused silica and had a construction as shown in FIG. 8.

Figure 10:
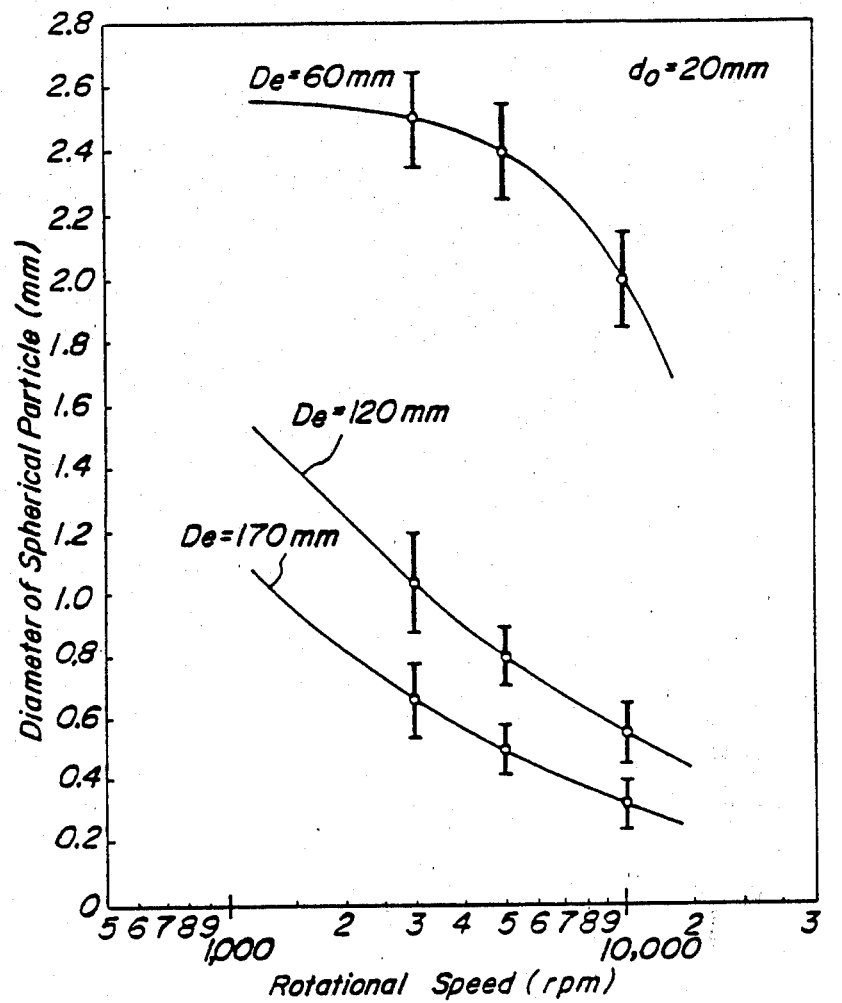
FIG. 10 is a graph showing the relationship between the mean diameter of steel particles with ranges of variation thereof and the rotational speed of a rotating disk, for the disk diameters of 60, 120 and 170 mm which are obtained from the practical operation of an apparatus for producing spherical steel particles according to the process of the present invention.

With the conditions described above, spherical particles of steel were produced, by treating steel stream in a nitrogen atmosphere by using disks with three different effective diameters De; namely, De=60 mm, 120 mm, 170 mm. FIG. 10 shows the relationship between the revolution speed and the diameter of the produced particles with indications of the diameter variation ranges for each effective disk diameter. The variation range of the particle diameter was considerably narrower than the allowable range given for steel-shot sizes by the Japanese Industrial Standard (JIS). These results relate to the fact that spherical particles of desired sizes can be produced by properly selecting the diameter and the rotational speed of the disk. The relationship between the rotational speed and the particle diameter of FIG. 10 was in fairly good agreement with the result of theoretical calculations.

EXAMPLE 2

Production of spherical particles and fibers of molten flux

The rotor unit was driven by a hydrostatic transmission apparatus, and the rotational speed was also automatically controlled with the control action of PI in the same way as that in Example 1. However, the output of the electric motor for driving the hydraulic oil pump was 10 kW, smaller than that in Example 1, while the control range of the rotational speed was considerably wider than that in Example 1 as 0 to 30,000 r.p.m. A conduit of graphite having an outlet opening diameter $d_o = 10$ mm was used, and molten flux of the following composition was introduced onto a graphite disk with the construction as shown in FIG. 9, for producing both spherical particles and fibers.

Composition of the molten flux: 41.2% silicon dioxide ($SiO_2$), 4.0% aluminum oxide ($Al_2O_3$), 1.9% ferric oxide ($Fe_2O_3$), 26.5% calcium oxide (CaO), 0.7% magnesium oxide (MgO), 7.2% sodium oxide ($Na_2O$), 11.4% sodium fluoride (NaF), 7.4% aluminum fluoride ($AlF_3$)

Density of the molten flux: 2.7 g/cm$^3$

Figure 11A:
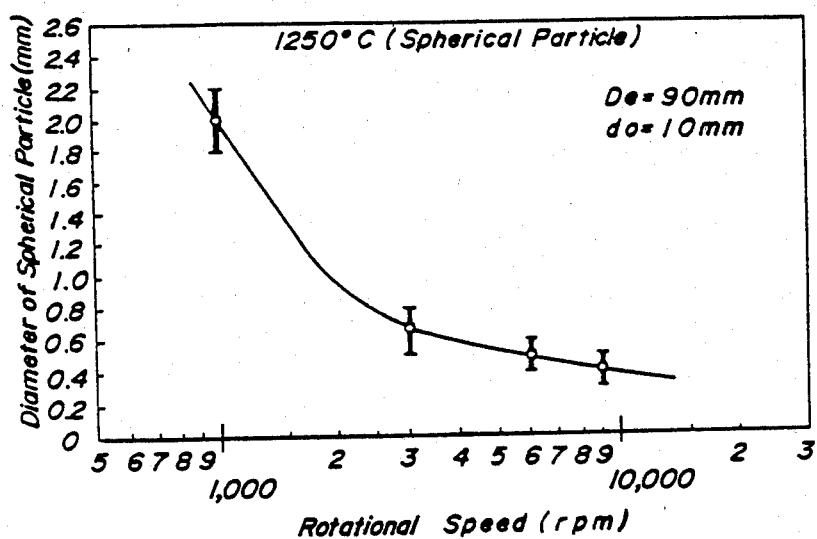
FIG. 11A shows a graph of the relationship between the diameter of a particle and the disk rotational speed.
Figure 11B:
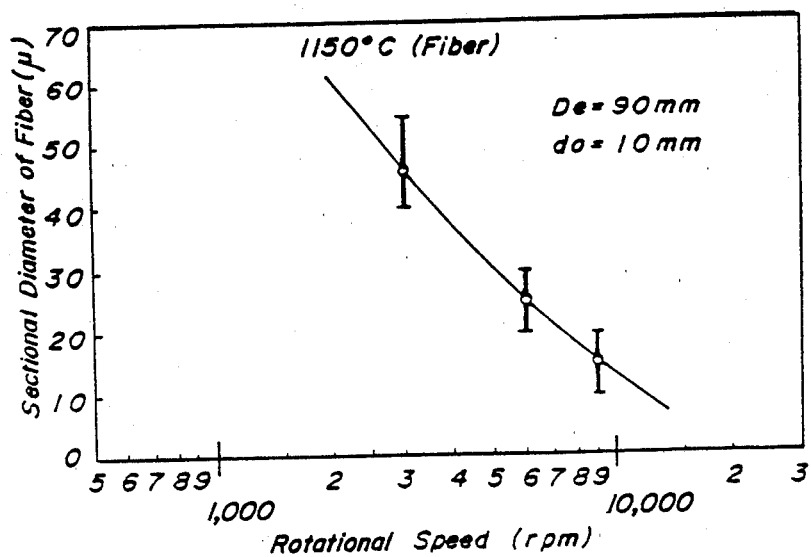
FIG. 11B shows the relationship between the fiber diameter and the disk rotational speed for the same flux, obtained from the practical operation of an apparatus for practicing the process of the present invention at each temperature of the melt; in which spherical particles and fibers are selectively produced from the same flux by adjusting the melt temperature, i.e., by controlling the viscosity value.

When being heated to a high temperature for reducing the kinematic viscosity, the molten flux was solidified in the form of spherical particles, while when being kept at a low temperature for increasing the kinematic viscosity, the molten flux was solidified in the form of fibers. The change of surface tension with temperature in the aforesaid silicate melt was negligibly small. Spherical particles and fibers were produced by using a rotating disk with effective diameter $D_e = 90$ mm at different rotational speeds. FIG. 11 shows the relationship between the rotational speed and the diameter of spherical particles and fibers obtained, showing additionally the diameter variation range of the products. The temperature, the treating speed, the kinematic viscosity, and the surface tension of the melt during the production of the spherical particles and the fibers were as follows.

Production of spherical particles:
Melt temperature: 1,250° C.
Mass-flow rate of the melt: 6 kg/min
Kinematic viscosity of the melt: 0.74 cm$^2$/sec
Surface tension of the melt: 510 dyne/cm
Production of fibers:
Melt temperature: 1,150° C.
Mass-flow rate of the melt: 2 kg/min
Kinematic viscosity of the melt: 1.2 cm$^2$/sec
Surface tension of the melt: 510 dyne/cm The relationship between the rotational speed and the diameter of the spherical particles and fibers in FIG. 11 was in good agreement with the result of theoretical calculation, and the variation of the size was very small. The lengths of the fibers produced were all longer than 500 mm.

EXAMPLE 3

Production of spherical particles and fibers of blast furnace slag

Spherical particles and fibers of blast furnace slag were produced by using the same process as in Example 2, except for the following conditions.

Figure 12A:
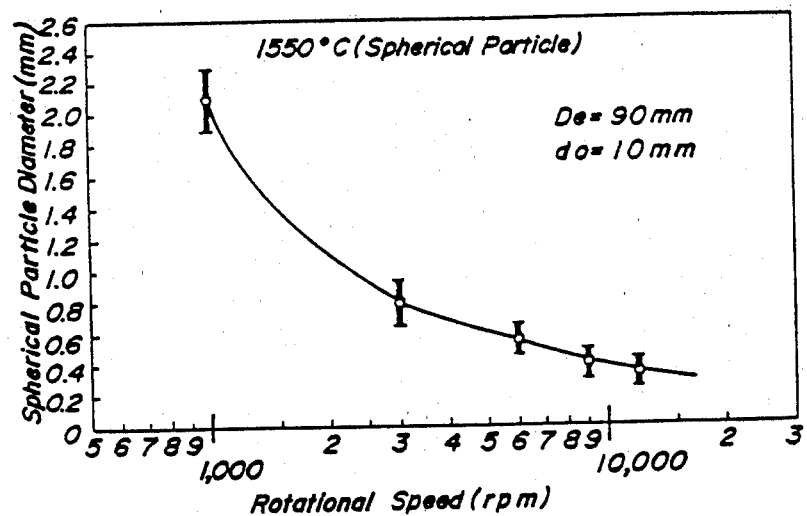
FIG. 12 shows graphs similar to those shown in FIG. 11, which are obtained from the treatments of the same blast furnace slag at each selected temperature of the melt for the production of spherical particles or fibers.
Figure 12B:
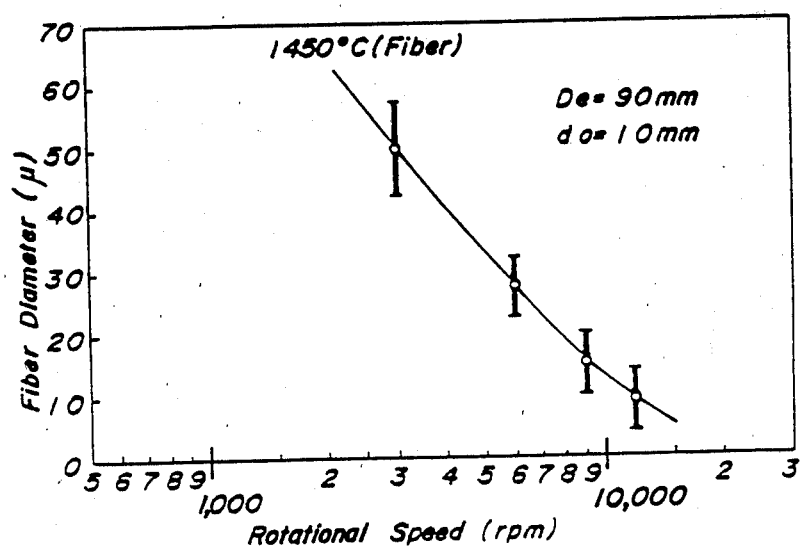

Composition of the blast furnace slag: 35.5% silicon dioxide ($SiO_2$), 10.2% aluminum oxide ($Al_2O_3$), 1.8% ferrous oxide (FeO), 45.3% calcium oxide (CaO), 7.2% magnesium oxide (MgO)
Density of the blast furnace slag: 2.65 g/cm$^3$
Production of spherical particles:
Melt temperature: 1,550° C.
Mass-flow rate of the melt: 5.5 kg/min
Kinematic viscosity of the melt: 0.85 cm$^2$/sec
Surface tension of the melt: 520 dyne/cm
Production of fibers:
Melt temperature: 1,450° C.
Mass-flow rate of the melt: 1.5 kg/min
Kinematic viscosity of the melt: 1.5 cm$^2$/sec
Surface tension of the melt: 520 dyne/cm FIG. 12 shows the relationship between the rotational speed and the diameter of the spherical particles and fibers, together with the variation ranges of said diameter.

Although the invention has been described with a certain degree of particularity, it is understood that the present disclosure has been made only by way of examples and that numerous changes in details of construction, the combination and arrangement of parts may be resorted to without departing from the scope of the invention as hereinafter claimed.

What is claimed is:

1. A process for producing fibers with an analytically predetermined diameter from a melt comprising:
   establishing a kinematic viscosity of the melt in a range of 0.001 to 10 cm$^2$/sec. by heating the melt at a temperature higher than its melting point, wherein said melt consists essentially of at least one material selected from the group consisting of metal, slag, flux and a mixture thereof;
   introducing the melt through a conduit at a predetermined outflow velocity in a range of 5 to 500 cm/sec. onto the center of a rotating disk having a rotational speed in the range of 3,000 to 30,000 rpm and an effective disk diameter of 50–200 mm having a flat refractory surface;
   locating said conduit having an outlet with a radius $r_o$ of 3 to 30 mm so that the distance $h_o$ between said conduit outlet and said disk surface is maintained within a range of $r_o/2$ to $r_o/2 + 2$ mm;
   forming a film stream of said melt with a predetermined thickness, at least, in the proximity of the periphery of said disk surface by centrifugal force, said film stream being provided with a tangential velocity component as well as a radial velocity component throughout the entire thickness thereof, by selecting an effective diameter of the disk surface in a range of 50 to 200 mm;
   projecting said film stream into a free space of air atmosphere from the periphery of said disk by said centrifugal force resulting from the rotation of said disk;
   splitting said film stream into free linear streams with a predetermined radius by sudden termination of said tangential velocity component and additional action of surface tension;
   sucking a gas stream in a direction parallel and cocurrent to said linear streams of the melt, thereby lengthening the path of motion of said linear streams; and
   solidifying said free linear streams with cooling by temperature difference between said linear stream and the ambient atmosphere during space motion to produce fibers with an analytically predetermined diameter.

2. A process for producing fibers with an analytically predetermined diameter from a melt comprising:
   establishing a kinematic viscosity of the melt in a range of 0.001 to 10 cm$^2$/sec., wherein said melt consists essentially of at least one material selected from the group consisting of metal, slag, flux and a mixture thereof;
   introducing the melt through a conduit at a predetermined outflow velocity in a range of 5 to 500 cm/sec. onto the center of a rotating disk having a flat refractory surface;

setting said conduit, having an outlet with a radius $r_o$ of 3 to 30 mm, so that the distance $h_o$ between said conduit outlet and said disk surface is maintained within a range of $r_o/2$ to $r_o/2+2$ mm;

forming a film stream of said melt with a predetermined thickness, at least, in the proximity of the periphery of said disk surface by centrifugal force, said film being provided with a tangential velocity component as well as a radial velocity component throughout the entire thickness thereof, by selecting an effective diameter of the disk surface in a range of 50 to 200 mm and a rotational speed of said disk in a range of 3,000 to 30,000 rpm depending upon the kinematic viscosity of the melt;

projecting said film stream into a free space from the periphery of said disk by centrifugal force;

splitting said film stream into free linear streams with a predetermined radius by sudden termination of said tangential velocity component and the additional action of surface tension;

sucking a gas stream in a direction parallel and cocurrent to said linear streams of the melt, thereby lengthening the path of said projection of said linear streams into the free space;

reducing the cooling rate at which said free linear streams are solidified, thereby elongating the length of the free linear streams and preventing formation of undesirable spherical droplets; and solidifying said elongated linear streams by cooling at said reduced cooling rate to produce continuous fibers with an analytically predetermined diameter.

3. The process of claim 1 wherein said melt contains suspended solid particles which are separated from said melt when said melt and particles are projected from said rotating disk.

4. The process of claim 1 wherein the ratio of surface tension to density of said melt is in a range of 40 to 400 dyne·cm$^2$/g.

5. The process of claim 1 wherein said rotating disk is a block of refractory material selected from the group consisting of fused silica, graphite, silicon carbide, silicon nitride, zircon, chamotte, alumina and magnesia.

* * * * *